(12) United States Patent
Alam et al.

(10) Patent No.: US 12,546,650 B2
(45) Date of Patent: Feb. 10, 2026

(54) SYSTEM, DEVICE AND METHODS FOR MEASURING LIGHT INTENSITY OF STREET LIGHTING AND ENVIRONMENTAL LIGHT POLLUTION

(71) Applicant: ELM, Riyadh (SA)

(72) Inventors: Syed Salman Alam, Riyadh (SA); Najam Us Saqib, Riyadh (SA); Riad Souissi, Riyadh (SA)

(73) Assignee: ELM, Riyadh (SA)

( * ) Notice: Subject to any disclaimer, the term of this patent is extended or adjusted under 35 U.S.C. 154(b) by 168 days.

(21) Appl. No.: 18/592,854

(22) Filed: Mar. 1, 2024

(65) Prior Publication Data

US 2025/0109986 A1   Apr. 3, 2025

Related U.S. Application Data

(60) Provisional application No. 63/587,579, filed on Oct. 3, 2023.

(51) Int. Cl.
  *G01J 1/42*   (2006.01)
  *G01J 1/02*   (2006.01)
  *G01J 1/44*   (2006.01)

(52) U.S. Cl.
  CPC ........... *G01J 1/4204* (2013.01); *G01J 1/0219* (2013.01); *G01J 1/0271* (2013.01); *G01J 1/4228* (2013.01);
  (Continued)

(58) Field of Classification Search
  CPC ...... G01J 1/4204; G01J 1/0219; G01J 1/0271; G01J 1/4228; G01J 1/44; G01J 2001/0257
  See application file for complete search history.

(56) References Cited

U.S. PATENT DOCUMENTS 6,330,519 B1 * 12/2001 Sawatari .................. B60Q 1/20
                                                                    340/602
9,646,499 B1    5/2017 Finlow-Bates et al.
(Continued)

FOREIGN PATENT DOCUMENTS

SG   10201508977      5/2017
TW     202314202 A    4/2023

*Primary Examiner* — Jennifer D Bennett
(74) *Attorney, Agent, or Firm* — Oblon, McClelland, Maier & Neustadt, L.L.P.

(57) ABSTRACT

A light intensity monitoring system, a light intensity monitor and a method for monitoring light intensity the light intensity monitor attached to a vehicle roof. The light intensity monitor includes light sensors which measure light intensity at a top wall and two sidewalls and records the location of the vehicle at precise time intervals using a global positioning sensor. A microcontroller within the monitor compiles the measured data into communications packets, which include light intensity measurements and the corresponding vehicle location for each measurement period. These packets are then wirelessly transmitted to a remote computing device using either a wireless network communications unit or a dual-mode near-field communications unit. The remote device receives the data and utilizes a mapping application to display the various light intensity levels, expressed in lux, with the location of the measurement. The remote device generates a time series compliance and an environmental light pollution report.

20 Claims, 26 Drawing Sheets

(52) U.S. Cl.
CPC ......... *G01J 1/44* (2013.01); *G01J 2001/0257* (2013.01)

(56) References Cited

U.S. PATENT DOCUMENTS

| | | | |
|---|---|---|---|
| 10,694,399 B1 | 6/2020 | Tran et al. | |
| 2009/0027759 A1* | 1/2009 | Albahri | B60J 3/04 359/601 |
| 2017/0122802 A1* | 5/2017 | Brown | G01J 1/0271 |
| 2018/0164157 A1* | 6/2018 | Pedersen | G01J 1/4228 |
| 2018/0343303 A1* | 11/2018 | Dudar | H04L 67/12 |
| 2019/0340924 A1* | 11/2019 | Abari | G08G 1/165 |
| 2021/0097859 A1 | 4/2021 | Abari et al. | |

\* cited by examiner

SYSTEM, DEVICE AND METHODS FOR MEASURING LIGHT INTENSITY OF STREET LIGHTING AND ENVIRONMENTAL LIGHT POLLUTION

CROSS REFERENCE TO RELATED APPLICATIONS

The present application claims the benefit of priority to U.S. Prov. App. No. 63/587,579 entitled "Methods And Systems For Measuring Light Intensity Of Street Lighting", filed on Oct. 3, 2023, and incorporated herein by reference in its entirety.

BACKGROUND

Technical Field

The present disclosure is directed to a system, a light intensity monitoring device and methods for measuring light intensity of street lighting and environmental light pollution.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Urban and suburban areas worldwide have long benefited from the advent of electric lighting, which has brought safety, convenience, and economic growth. These artificially lit environments have become a standard for modern living, with street lighting systems providing illumination after sunset. Conventionally, these lighting systems have had little detrimental impact on the environment. However, there are sensitive zones within and around these areas, such as habitats for protected species and regions with unique natural features, where regulation of light intensity is crucial to prevent ecological disruption.

The significance of regulating light intensity cannot be overstated, as excessive artificial lighting, often referred to as light pollution, can affect nocturnal wildlife, plant species, insect species, and human health. To safeguard these vulnerable ecosystems and life forms, compliance with lighting standards (also referred to as light-intensity standards) is paramount. These standards vary based on the type of infrastructure, such as roads, sidewalks, conservation areas, and the like, and are characterized by specific vertical and horizontal light intensity thresholds.

Conventionally, compliance with these lighting standards has been achieved through routine manual inspections or by employing portable handheld sensors to monitor light levels. Such inspections, while somewhat effective, are labor-intensive and prone to human error, especially when scaling large areas that modern municipalities encompass.

The existing systems for streetlight measurement and monitoring, although functional, are fraught with inefficiencies. The manual nature of these practices necessitates extensive manpower, time, and financial resources. Furthermore, the utilization of discrete handheld devices for capturing light intensity and GPS location data results in a fragmented approach that hampers the aggregation of meaningful insights. This piecemeal data collection process is not only tedious but also susceptible to inaccuracies that may compromise compliance efforts.

Published patent applications US20210097859 and SG10201508977 describe light sensors mounted to the roofs of vehicles that measure light from street lamps and send the light intensities, timestamps, and geolocations to a server which generates a light intensity map.

Published patent application US20210097859A1 describes an ambient light sensor installed on a vehicle which measures ambient light as the vehicle moves through a region. Over time, the ambient light measurements gathered by the vehicle may be used to generate a spatial and/or temporal map of ambient light information. However, US20210097859A1 does not mention the structure of the sensors, of a weatherproof housing including three light intensity sensors, each covered by a Fresnel lens, or connecting the weatherproof housing to the roof by a pair of neodymium magnets.

Patent U.S. Pat. No. 10,694,399B1 describes a plurality of monitoring units mounted on lamp posts to monitor light output from street lamps. However, the monitoring units are not designed to be carried on the roof of a vehicle that travels a city collecting street light statistics. Further, the application fails to describe the structure of the light intensity sensors having weatherproof housing.

Patent U.S. Pat. No. 9,646,499B1 describes the crowd-sourced detection of defective street lights, including receiving reporting data from a plurality of vehicles. However, the application failed to describe mapping the data and the sensors having a particular protected structure.

Each of the aforementioned references suffers from one or more drawbacks hindering their adoption. The conventional setup poses challenges compounded by the of a unified, integrated solution capable of providing accurate and timely data on light intensity across expansive urban landscapes and the provision of a robust structure that can protect the light intensity sensors from external environmental factors, such as excessive wind, rain, water and the like. The conventional setups thus lack the ability to enable the regulatory authorities to enforce compliance but also pose a significant obstacle to the effective management of light pollution.

A modern, integrated solution is needed in the face of these challenges. There exists a need for a system which is cost-effective, user-friendly, and capable of automating the data collection process across vast areas. The system should eliminate the need for multiple handheld sensors and manual data aggregation, instead providing a unified platform for capturing and analyzing light intensity data in relation to established municipal standards.

Accordingly, it is one object of the present disclosure to provide methods and systems for monitoring the light intensity, reducing the complexity and potential for error associated with manual methods. The systems and methods of the present disclosure enable efficient, large-scale sampling of light intensity, harnessing the power of automation and contemporary Internet of Things (IoT) technology.

SUMMARY

In an exemplary embodiment, a light intensity monitoring system for use with a vehicle travelling on a roadway is described. The light intensity monitoring system includes a waterproof housing having a top wall, four sidewalls and a bottom wall, a first light sensor mounted within a first sidewall, wherein the first light sensor is configured to an intensity of light impinging on an outer surface of the first sidewall, a second light sensor mounted within a second sidewall, wherein the second sidewall is directly opposite the first sidewall, wherein the second light sensor is configured to measure an intensity of light impinging on an outer surface of the second sidewall, a third light sensor mounted within the top wall, wherein the third light sensor is configured to measure an intensity of light impinging on the first sensor from above the waterproof housing, wherein the first light sensor, the second light sensor and the third light sensor are each covered by a Fresnel lens mounted over the respective light sensor on the outer surface of the waterproof housing. A pair of magnets are mounted within the bottom wall, wherein the pair of magnets are configured to attach the waterproof housing to a roof of the vehicle. A power connector is mounted within a third sidewall near the bottom wall and a circuit board is mounted in the waterproof housing on the third sidewall above the power connector, wherein the circuit board includes: a wireless network communications unit, a dual-mode near-field communications unit, a global positioning receiver, an inter-integrated circuit (I2C) connected to each of the first light sensor, the second light sensor and the third light sensor, a microcontroller operatively connected to the power connector, the wireless network communications unit, the dual-mode near-field communications unit, the global positioning receiver and the I2C circuit, wherein the microcontroller includes circuitry and a memory including programming instructions stored therein that, when executed by one or more processors, cause the one or more processors to: generate light sensor actuation signals, transmit the light sensor actuation signals to the I2C switch, receive the measurements of the first intensity of light, the second intensity of light and the third intensity of light over a first sampling time from the I2C switch, receive the location of the vehicle during the first sampling time from the global positioning receiver, generate a communications packet including the measurements of the first intensity of light, the second intensity of light, the third intensity of light and the location of the vehicle, and transmit the communications packet over one of the wireless network communications unit and the dual-mode near-field communications unit to a remote computing device and a remote computing device including a mapping application, wherein the remote computing device is configured to receive the communications packet and display the measurements of the first intensity of light, the second intensity of light and the third intensity of light on a map of the mapping application.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2C-2 shows a Fresnel lenses mounted on a left side of the waterproof housing of the system, according to certain embodiments.

FIG. 2C-3 shows Fresnel lenses mounted on front side of the waterproof housing of the system, according to certain embodiments.

FIG. 2C-4 shows Fresnel lenses mounted on top of the waterproof housing of the system, according to certain embodiments.

FIG. 2F-1 depicts a pictorial representation of a global positioning system (GPS) antenna integrated with a long-term evolution (LTE) modem, according to certain embodiments.

FIG. 2F-2 depicts the GPS antenna and a GPS connector, according to certain embodiments.

FIG. 2H-1 depicts the GPS antenna integrated with the LTE modem, according to certain embodiments.

FIG. 2H-2 depicts an LTE antenna, according to certain embodiments.

DETAILED DESCRIPTION

Figure 1A:
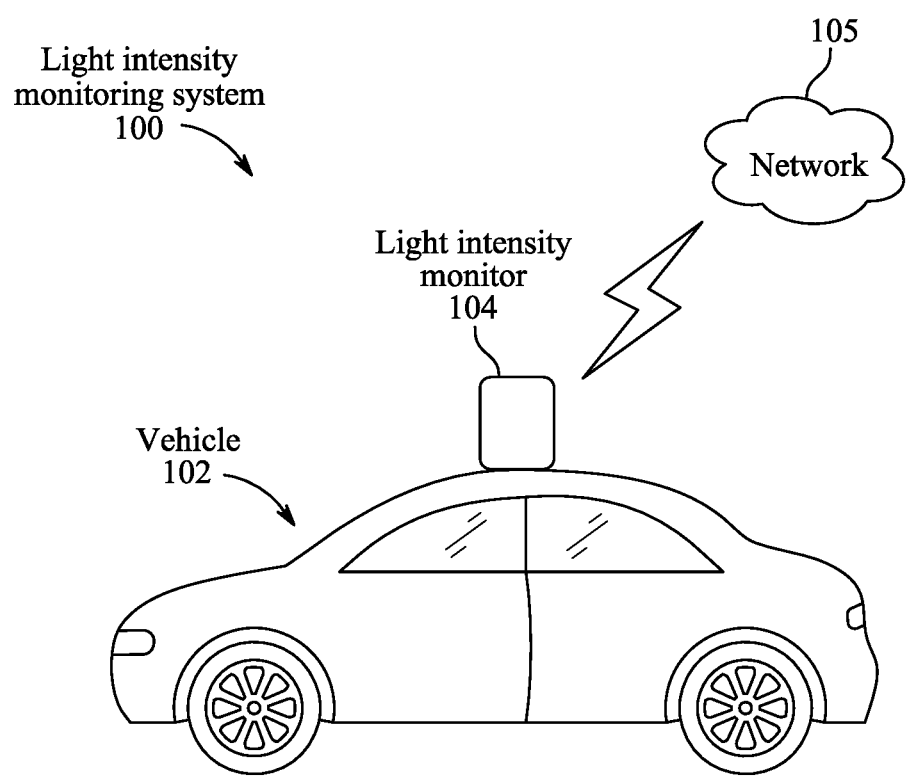
FIG. 1A presents a schematic representation of an exemplary light intensity monitoring system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the present disclosure are directed to a system, device, and method for monitoring light intensity along a roadway. Light intensity above a defined threshold may be indicative of light pollution and is measured to determine adherence to compliance levels of light in municipal areas. For example, as per municipal regulations, a range for light intensity is defined for municipal areas. Light intensity lower or higher than the range value can be regarded as light pollution. In one example, light pollution is caused by faulty streetlights in the area. Therefore, to prevent light pollution, light intensity monitoring is performed periodically.

The device of the present disclosure, referred to as a light intensity monitor, is portable and can be mounted on top of a vehicle. The light intensity monitor is configured to measure light intensity data and measure a location of the vehicle. The light intensity data is then processed and visualized, and a report on compliance, corresponding to the light intensity at a particular location, is generated.

FIG. 1A presents a schematic representation of an exemplary light intensity monitoring system 100. The exemplary light intensity monitoring system 100, alternatively referred to as a system, includes a light intensity monitor 104 mounted on top of a vehicle 102 and a network 105. In an implementation, the light intensity monitor 104 is primarily positioned on the vehicle's roof. However, alternative mounting locations on vehicle 102 may include the rear portion or front portion of the vehicle. In another aspect, the light intensity monitor 104 can be a handheld device held by an operator and/or outside the vehicle 102 window.

Mounting of the light intensity monitor 104 to the vehicle 102 can be achieved using multiple techniques. One such technique involves securing the light intensity monitor 104 to the roof of the vehicle using a pair of magnets. An alternate mounting technique includes, but is not limited to, two straps placed at opposite ends along the length of the monitor 104, or in conjunction with an adhesive which could be employed at the base of the light intensity monitor 104 to ensure its adherence to the vehicle's roof.

The vehicle 102 can be any land-based mode of transportation, including but not limited to cars, trucks, vans, or buses. It might also encompass vehicles designed for sea travel, such as ships, or boats employed to measure light intensity along a shore or a deck. The vehicle 102 may be operated autonomously or semi-autonomously. The vehicle 102 may serve as a personal vehicle, taxicab, self-driving automobile, or a form of public or mass transit. The vehicle 102 is intended to carry passengers or cargo along a predetermined route and allows the light intensity monitor 104 to display media content and/or gather information throughout the journey.

The network 105 facilitates connectivity to the light intensity monitor 104 and enables interfacing with other smart devices (not shown in FIG. 1A) linked to the network 105. The smart devices may include computing devices, such as mobile phones, tablets, car systems, and desktop or laptop computers. The smart device may be a Bluetooth enabled car, tablet or phone-except use near-field enabled and the like. The light intensity monitor 104 can establish a connection with a mobile device owned by the driver or a passenger of the vehicle, enabling the input of information concerning the route traversed or to passively a mass data from the mobile device. Additionally, the light intensity monitor 104 may collect data passively from other network 105-connected computing devices, or location information from devices like Wi-Fi beacons. The network 105 may be of various types, such as a cellular network, a Wi-Fi network, or another form of network.

Figure 1B:
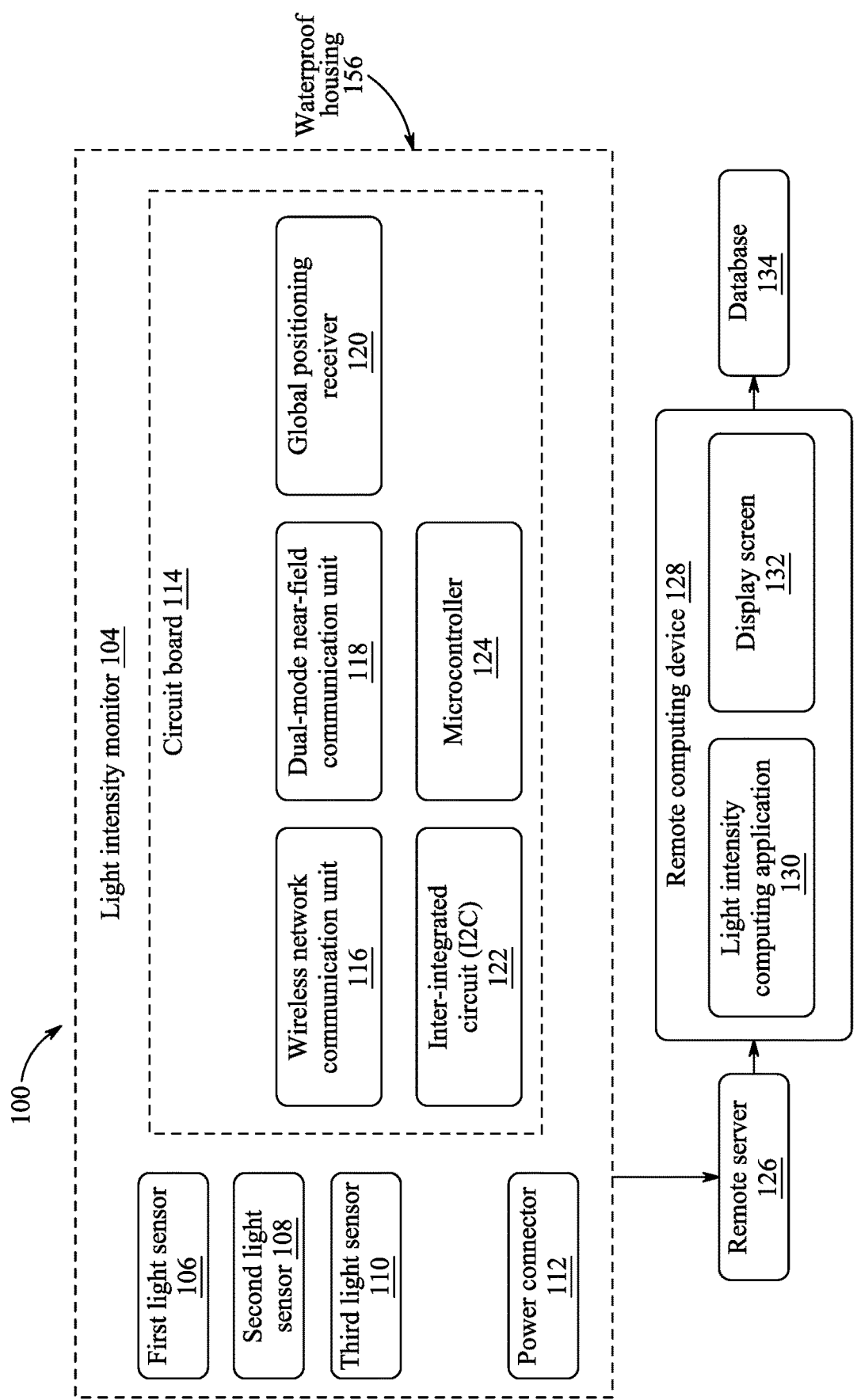
FIG. 1B illustrates a schematic representation of a light intensity monitoring system, according to certain embodiments.

FIG. 1B illustrates a schematic representation of a light intensity monitoring system 100. The light intensity monitoring system 100, alternatively referred to as a system 100, is designed to function in tandem with a vehicle 102 travelling on a roadway. The system 100 is enclosed within a weatherproof and preferably waterproof housing, which has a sturdy construction that includes a top wall, a quartet of sidewalls, and a bottom wall, ensuring the internal components are shielded from water ingress and other environmental factors. The system 100 includes but is not be limited to a plurality of light sensors (106, 108, and 110), a power connector 112, a circuit board 114 integrated with various system components, and a remote computing device 128.

In one aspect, the weatherproof housing, as described earlier, is a waterproof housing for the system.

In the case of electronic devices, such as the system 100, exposure to environmental elements like rain, dirt, dust, mud, snow, and water can cause damage. Therefore, the waterproof housing is configured to protect the system 100 from such environmental elements. The waterproof housing is a sturdy structure that is not fragile and susceptible to damage from mishandling or dropping, thereby safeguarding the system 100 from adverse conditions and mistreatment.

The waterproof housing is a rectangular structure and has six walls, including a top wall, a bottom wall, a first sidewall, a second sidewall, a third sidewall, and a fourth sidewall. The first sidewall and the second sidewall are placed opposite to each other. The third sidewall and the fourth sidewall are placed opposite to each other. The third sidewall and the fourth sidewall are perpendicular to the first sidewall and the second sidewall. The bottom wall is placed at the bottom of the waterproof housing and mounted on a vehicular surface. The top wall is placed opposite to the bottom wall.

In one aspect, the waterproof housing includes a removable lid located on the fourth sidewall of the waterproof housing. The removable lid is configured to ensure the integrity and durability of the device, especially in outdoor conditions.

The fourth sidewall of the waterproof housing is constructed with four corners, each fortified with a threaded channel. The threaded channels are configured to accommodate the secure fastening of the lid. Aligned with these channels are four screw holes located on the removable lid itself. Each screw hole is intentionally positioned to correspond with one of the threaded channels on the waterproof housing.

To secure the lid onto the waterproof housing 156, four screws are provided. Each screw is designed to pass through a screw hole in the lid and into one of the threaded channels, allowing the lid to be firmly attached to the housing. The removable lid secured to the waterproof housing 156 thus ensures that the internal components of the device are protected from environmental elements and unauthorized access.

Additionally, a gasket 404 (See FIG. 4A) is positioned on the edge of the fourth sidewall of the waterproof housing 156 to enhance the seal. The gasket 404 is tailored to fit between the lid and the contacting surface of the housing, providing a waterproof barrier that prevents moisture ingress. The gasket is provisioned for maintaining the function and longevity of the light intensity monitoring system 100, particularly when deployed in areas exposed to rain, splashes, or other sources of moisture.

In accordance with an aspect of the present disclosure, a support board 237 (See FIG. 2H-1) is mounted within the waterproof housing 156 perpendicular to the circuit board 114 and beneath the top wall. The support board 237 is configured to support the global positioning receiver such that an internal antenna of the global positioning receiver 236 is oriented to face towards the top wall.

The system 100 includes the plurality of light sensors (106, 108, and 110) for measuring the light intensity. The light intensity measurements have units of lumens per square area (lux). In an implementation, three light sensors (106, 108, and 110) are installed within the waterproof housing 156 to optimize light intensity measurement from various angles. The first light sensor 106 is mounted through an aperture within the first sidewall. The first light sensor 106 is configured to receive an intensity of light impinging on an outer surface of the first sidewall. The sensor can, for example, measure ambient light and light from streetlights in urban settings and the glare from oncoming traffic. The second light sensor 108 is mounted through an aperture within the second sidewall. The second light sensor 108 is configured to measure an intensity of light impinging on an outer surface of the second sidewall. The first light sensor 106 opposite the second light sensor 108 performs an analogous function, potentially providing comparative data on lighting conditions or detecting asymmetries in ambient light that could influence driving conditions. The third light sensor 110 is mounted through an aperture within the top wall. The third light sensor 110 is configured to measure an intensity of light impinging on the first light sensor 106 from above the waterproof housing. The third light sensor 110, measures the overhead light sources, such as sunlight or streetlights.

The first light sensor 106, the second light sensor 108 and the third light sensor 110 are each covered by a Fresnel lens mounted over the respective light sensor on the outer surface of the waterproof housing. The Fresnel lenses, known for their ability to concentrate light with minimal bulk, are affixed atop the sensors on the outer surfaces of the waterproof housing. The lenses channel the incoming light efficiently onto the sensors, thus ensuring a high degree of measurement precision.

To affix the monitoring system 100 securely to the vehicle, a pair of magnets 210 (FIG. 2A) are integrated into the bottom wall. The pair of magnets is strong and reliable and allows for the swift installation of a light intensity monitor 104 atop the vehicle's roof without the need for additional tools or permanent alterations to the vehicle. This feature exemplifies the adaptability of the system to different vehicle 102 types, from personal sedans to delivery vans. In one example, the pair of magnets are neodymium magnets.

Electrical power is supplied to system 100 through the power connector 112, which is mounted within the third sidewall and positioned near the bottom wall to facilitate convenient access to the vehicle's power source. A circuit board 114 is mounted on the third sidewall above the power connector 112. An aperture for the power connector 112 is provided.

The circuit board 114 is an assembly hosting a suite of components that include a wireless network communications unit 116 for remote data transmission, a dual-mode near-field communications unit 118 for proximity-based interactions, a global positioning receiver 120 to ascertain the vehicle's location, an inter-integrated circuit (I2C 122) connected to each of the first light sensor 106, and a microcontroller 124.

The wireless network communication unit 116 of the light intensity monitoring system 100 enables the system 100 to communicate with remote devices over the wireless network 105. For instance, the wireless network communication unit 116 utilizes a Long-Term Evolution (LTE) modem, usually implemented in smartphones and mobile hotspots, configured to communicate over one or more of a 2G, a 3G, a 4G, a 5G wireless network 105 or other network generations. The LTE modem is configured for high-speed data transmission, allowing the device to send substantial amounts of data with efficiency and reliability over a cellular network 105 that spans a wide geographical area. In a non-limiting example, communication is established through an API endpoint using the JSON format, which is the standard data interchange format that ensures compatibility and ease of integration with modern web services.

The wireless network communication unit 116 interacts with backend systems via an Application Programming Interface (API), which is a set of protocols and tools for building software and applications. As known, the API allows different software systems to communicate with each other. Accordingly, in the implementation, the API is configured to receive data, such as light intensity readings and GPS location, from the microcontroller 124 of the system.

In one aspect, data transmitted to the API is formatted using JavaScript Object Notation (JSON), which is a lightweight data-interchange format. In another aspect, the data may be formatted using other formats, such as extensible Markup Language (XML), comma-separated values (CSV) and the like. JSON is preferred due to its convenience to read and write and is easy for machines to parse and generate. JSON is based on a subset of the JavaScript Programming Language and offers a standardized format for structuring data so that it is readily parsed by various software systems.

To elaborate with an example, when the light intensity monitoring system 100 captures data from its sensors, the wireless network 105 communication unit 116 may send the information directly to a central server, for example a city's municipal corporation, or to a user device, where an API endpoint has been set up to receive light intensity data. Upon receiving the data, the management section of the municipal corporation can then use this data to determine the functionality and compliance of streetlights in real-time. The wireless network 105 communication unit 116 provides an efficient means for remote data communication and monitoring.

In one aspect, the GPS receiver 120 is implemented to measure the location of the vehicle. The GPS receiver 120 is an electronic device that receives and decodes signals from the GPS satellite constellation to determine the geographic location of the device. The receiver calculates its position by precisely timing the signals sent by GPS satellites high above the Earth. Each satellite continually transmits messages that include the time the message was transmitted, precise orbital information (the ephemeris), and the general system health and rough orbits of all GPS satellites (the almanac).

In accordance with the present disclosure, the GPS receiver 120 functions in a continuous operation mode. The GPS receiver 120 consistently acquires signals from the GPS satellites to calculate and update the location of the vehicle periodically. This frequent updating ensures that each set of light intensity data collected by the device is associated with an accurate, up-to-date geographic location. The GPS receiver 120 allows the program to pinpoint the exact locations where light intensity measurements are taken, facilitating a spatial analysis of the data.

In one aspect of the present disclosure, the Inter-Integrated Circuit (I2C) 122 establishes a communication link with each of the light sensors. The I2C 122 protocol is a communication standard designed for short-distance data exchange between various integrated circuits, commonly known as "chips," on a single printed circuit board (PCB). The I2C 122 protocol facilitates a streamlined method for multiple "peripheral" chips to send and receive data to and from one or more "controller" chips within a device. I2C 122 protocol is simple and efficient. It operates using only two signal wires, despite accommodating communication with multiple chips. The two wires are known as a serial data line (SDA) and a serial clock line (SCL). The SDA line is used for transferring data between the integrated circuits, while the SCL line synchronizes the data transfer by providing a clock signal that coordinates the data transmission between the chips.

In an example, I2C 122 implementation may also be used in communication with a smartphone, where the I2C 122 protocol could be used for the microcontroller to communicate with various sensors, such as an accelerometer, a gyroscope, or an ambient light sensor. Each of these sensors acts as a peripheral device on the I2C 122 bus, and the microcontroller acts as the controller, coordinating the data exchange between these components. Another example of the I2C 122 protocol is in the automotive industry. Modern vehicles use various sensors and controllers that need to communicate with each other. The I2C 122 can be used to connect sensors like temperature or pressure sensors to the main vehicle 102 control unit. Such a setup minimizes the wiring complexity and allows for a more compact and efficient design.

In accordance with the present disclosure, the I2C 122 protocol enables the central microcontroller 124 to receive data from the three light sensors. The data is then processed and transmitted via a wired or a wireless network 105 to a remote location for analysis.

In one aspect, the dual-mode near-field communications (NFC) unit of the light intensity monitoring system 100 is configured to enable close-range communication between the remote computing device 128, the connected smart user devices, and other NFC-enabled devices. In one example, the NFC operates in a passive mode. In another mode, the NFC operates in active mode.

The dual-mode NFC unit 118 allows for seamless data transfer and configuration in the field without the need for cumbersome cables or complex setup procedures. For example, an employee at the municipal corporation can download the data from the smart device by bringing the NFC-enabled smart device into close contact with the system. The dual-mode NFC, thus, enhances the user experience by simplifying the interaction with the device, making field operations more efficient and user-friendly. The dual-mode NFC unit 118 is configured to facilitate a variety of tasks, such as easy device identification, retrieval of measurement data, device configuration, and other tasks where short-range wireless communication can streamline operations and reduce the need for direct physical connectivity.

The microcontroller 124 is connected to the power connector 112, the wireless network 105 communication unit 116, the dual-mode near-field communications unit, the global positioning receiver, and the I2C 122. The microcontroller 124 contains an electronic circuitry and a memory that stores programming instructions. When executed by one or more processor(s), the instructions execute the activities of the system. The one or more processor(s) are configured to generate light sensor actuation signals, transmit the light sensor actuation signals to the I2C switch 136, receive the measurements of the first intensity of light, the second intensity of light, and the third intensity of light over a first sampling time from the I2C switch 136, receive the location of the vehicle 102 during the first sampling time from the global positioning receiver, generate a communications packet including the measurements of the first intensity of light, the second intensity of light, the third intensity of light and the location of the vehicle, and transmit the communications packet over one of the wireless network communications unit 116 and the dual-mode near-field communications unit 118 to a remote computing device 128.

In an aspect, the microcontroller 124 is configured to continue to receive measurements of the first intensity of light, the second intensity of light and the third intensity of light, and the location over successive sampling times and transmit the measurements and the location of the vehicle 102 for each successive sampling time in successive communications packets in real time.

The packet is dispatched through the wireless or near-field communication channels to the remote computing device 128. The remote computing device 128 is equipped with a mapping application and configured to receive the measurements and the location for each successive sampling time and display the measurements and the location for each successive sampling time on the map.

The remote computing device 128 functions as the receiving and processing endpoint for data transmitted from the system. The remote computing device 128 can be a smart device, such as computer, tablet, smartphone, or any other smart device capable of connecting to a network 105 and interface with the system.

In one aspect, the remote computing device 128 hosts a mapping application for displaying geolocated data. The mapping application is specifically designed to interpret the incoming packets of information, which include the light intensity readings from the various sensors as well as the GPS location of the system, the hardware and firmware versions, and the unique Media Access Control (MAC) address of the system.

Once the data packet is received, the mapping application on the remote computing device 128 visualizes the data on a digital map interface. The visualization is instrumental in providing users with immediate and intuitive access to the data, illustrating where each reading was taken and allowing for simplified analysis of the light intensity across different geographic locations.

The remote computing device 128 includes a light intensity monitoring computing application 130, alternatively referred to as an application hereinafter. The application 130 is designed to process and display data collected by the light intensity monitoring system 100. The application 130 is installed on a remote computing device, such as a computer, tablet, or smartphone. The application 130 also provides an interactive interface for users to interact with the data, possibly including the ability to filter, search, and analyze the light intensity information in various ways. The microcontroller 124, as described earlier, is configured to transmit the successive communications packets by the dual-mode near-field communications transceiver to the smart device in real time. Based on the successive communication packets received from the microcontroller 124, the light intensity monitoring computing application 130 is configured to display the map on a display screen 132 of the smart device.

The backend of the remote computing device 128 also includes filtering tools. The filtering tools enable users to sift through the data based on specific criteria, such as high or low light intensity readings or geographical areas of interest. The filtering tools are useful for identifying areas of non-compliance with light intensity regulations or for pinpointing malfunctioning streetlights.

In one example, the remote computing device 128 can be used by city officials to monitor and manage street lighting in real-time, by maintenance teams to identify and respond to issues more efficiently, and/or by researchers conducting environmental studies on light pollution.

The system 100 includes a remote server 126. The microcontroller 124 is configured to transmit the data packets via the wireless network communications unit to the remote server 126. The remote server 126 is configured to receive the data packets. Each data packet may contain, but may not be limited to, a sequence of light intensity readings, a light intensity monitoring system identification and corresponding location information. Upon receipt, the server 126 is further configured for forwarding the data packets to the remote computing device 128. In one implementation, the transmission process is executed wirelessly, obviating the need for direct physical connection and thus broadening the applicability and ease of use of the light intensity monitoring system 100.

The remote computing device 128 is wirelessly connected to the remote server 126 and includes a light intensity monitoring computing program, a set of instructions, which, upon execution, performs one or more functions related to light intensity monitoring.

The remote computing device 128 installs the light intensity monitoring computing application 130, as described earlier. The light intensity monitoring computing application 130 is configured to display a visual representation of the data on the display screen 132. The representation of data takes the form of a map, which serves as a spatial context for the light intensity readings, allowing users to easily discern and analyse the data based on geographic location. Such a configuration of the remote computing device 128 connected to the remote server 126 allows for detailed monitoring and assessment of light conditions in various environments. The light intensity monitoring computing application 130's interface on the remote computing device 128 is designed for clarity and ease of navigation, enabling users such as municipal authorities, maintenance teams, or environmental analysts to interact with and derive insights from the data with minimal complexity.

The circuit board 114 is connected to a battery of the vehicle 102 to receive power to operate the microcontroller 124, the first light sensor 106, the second light sensor 108, the third light sensor 110, the wireless network communications unit and the dual-mode near-field communications unit. In one implementation, the circuit board 114 is connected to the battery through the power connector 112. The vehicle's battery serves as the primary power source for the system. The battery provides the necessary electrical power to operate the system's microcontroller 124, the light sensors (106, 108, 110), the wireless network communications unit 116, and the dual-mode near-field communications unit 118, the global positioning receiver 120, the I2C 122 and such other functional components.

The system 100 further includes a database 134. The database 134 contains expected light intensity measurements specific to various locations along the roadway. These expected measurements are quantified in lumens per square area, commonly referred to as lux, which is a standard unit of measurement in photometry. Lux measures the amount of light that is present over a given area, providing a quantifiable means to assess the level of illumination. In one aspect, the database 134 further includes environmental light level standards for each location.

The database 134 is connected to the remote computing device 128. The remote computing device 128 is configured to generate a time series compliance report. In one aspect, the lux levels at each location record the intensity of street lighting at each location. In another aspect, the lux levels at each location record the environmental light level at each location. The compliance report methodically compares the real-time lux levels captured at each location by the monitoring system 100 to the predefined expected lux levels that are stored within the database 134.

The purpose of the compliance report is to demonstrate that compliance with established lighting standards is ensured. For instance, in areas where specific lux levels are mandated for safety or environmental reasons, the remote computing device 128 can automatically determine whether the actual light intensity measurements fall within the required thresholds. If discrepancies are found, such as under-lighted or over-lighted areas, the system 100 can flag these instances for further review or immediate action. Thus, in one aspect, the compliance report is an indicator of a faulty streetlight for each location at which the lux level of the street lighting is not equal to or greater than the expected lux level. In another aspect, the compliance report includes an environmental light pollution alert for each location when the lux level of the environmental light level is greater than the environmental light level standard for the location.

Figure 1C:
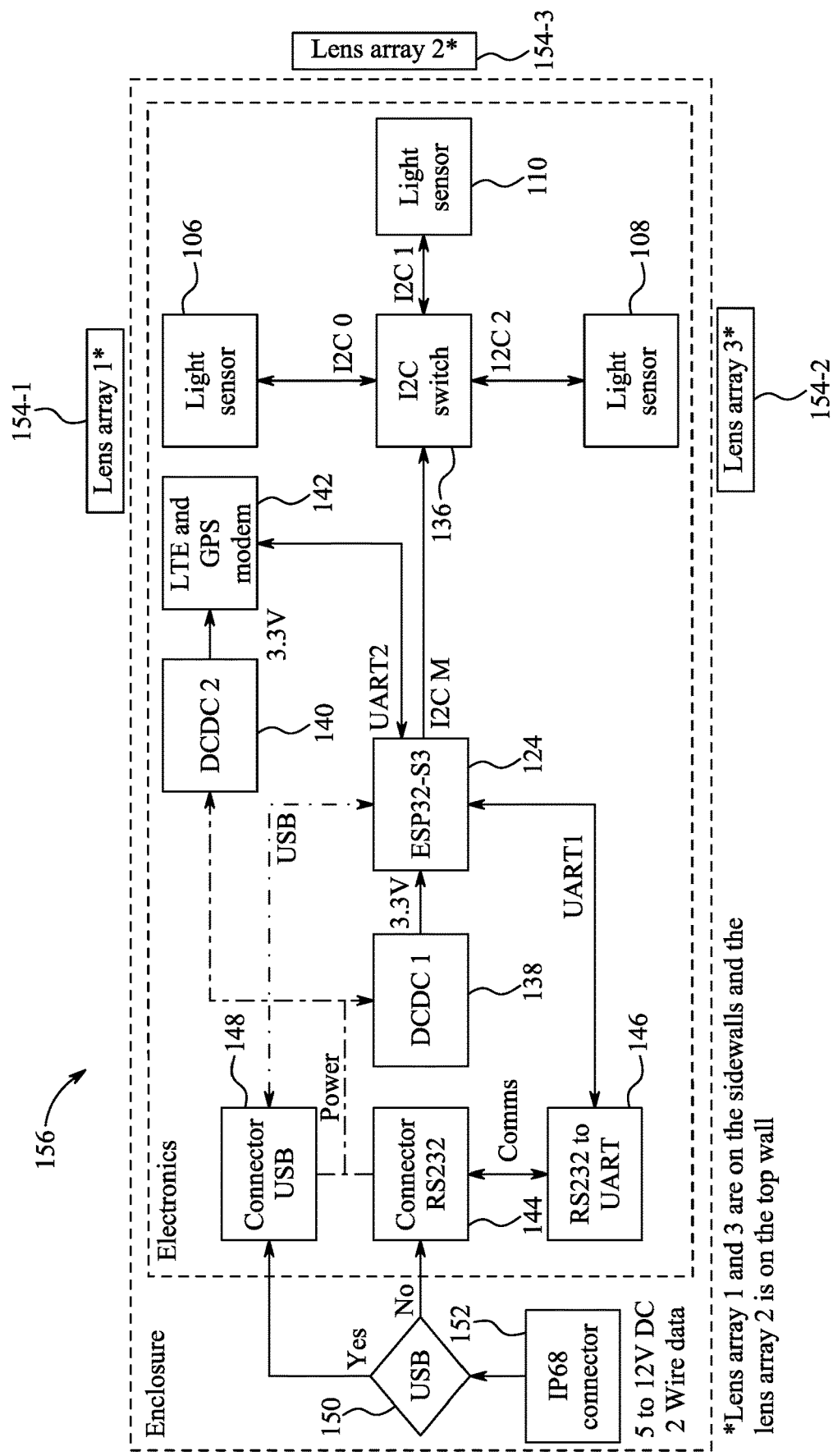
FIG. 1C illustrates a schematic representation of connections between component of the light intensity monitor, according to certain embodiments.

FIG. 1C illustrates a schematic representation of the system 100. Referring back to FIG. 1B, the system 100 includes the light intensity monitor 104 enclosed within the waterproof house. The light intensity monitor 104, alternatively referred to as a monitor 104 hereinafter, is configured for measuring environmental light along a roadway. The monitor 104 includes, but may not be limited to, the waterproof housing 156, as shown in FIG. 1C, the first light sensor 106, the second light sensor 108, the third light sensor 110, the power connector (112, 152) and the circuit board 114.

The waterproof housing 156 includes a top wall, four sidewalls and a bottom wall. The first light sensor 106 is mounted within the first sidewall. The first light sensor 106 is configured to record an intensity of light impinging on an outer surface of the first sidewall. The second light sensor 108 is mounted within a second sidewall. The second sidewall is directly opposite the first sidewall. The second light sensor 108 is configured to measure an intensity of light impinging on an outer surface of the second sidewall. The third light sensor 110 is mounted within the top wall. The third light sensor 110 is configured to measure an intensity of light impinging on the first sensor from above the waterproof housing. The first light sensor 106, the second light sensor 108 and the third light sensor 110 are each covered by a Fresnel lenses (154-1, 154-2 and 154-3) mounted over the respective light sensor on the outer surface of the waterproof housing 156.

The light intensity monitoring system 100 includes a pair of magnets (not shown in FIG. 1C), mounted within the bottom wall, configured to attach the waterproof housing to a roof of the vehicle, a power connector 112 mounted within a third sidewall near the bottom wall, and a circuit board 114 mounted in the waterproof housing 156 on the third sidewall above the power connector 112. The circuit board 114 includes a wireless network communication unit 116, a dual-mode near-field communications unit 118, a global positioning system receiver 120, and an inter-integrated circuit (I2C) 122, all connected to a microcontroller 124, and the first light sensor 106, the second light sensor 108 and the third light sensor 110. The wireless network communication unit 116, the dual-mode near-field communications unit 118, the global positioning system receiver 120, and the inter-integrated circuit (I2C) 122, the first light sensor 106, the second light sensor 108 and the third light sensor 110 are operatively connected to the power connector 112.

As shown in FIG. 1C, the wireless network communication unit 116 is implemented as LTE and GPS modem 142. In a non-limiting example, the microcontroller 124 is implemented as an ESP32 available from Espressif Systems Co., LTD, Shanghai, China. The microcontroller 124 includes circuitry and memory including programming instructions stored therein that, when executed by one or more processors, cause the one or more processors to generate light sensor actuation signals, transmit the light sensor actuation signals to the I2C switch 136, receive the measurements of the first intensity of light, the second intensity of light and the third intensity of light over a first sampling time from the I2C switch 136, receive the location of the vehicle 102 during the first sampling time from the global positioning receiver, generate a communications packet including the measurements of the first intensity of light, the second intensity of light, the third intensity of light and the location of the vehicle, and transmit the communications packet over one of the wireless network communication unit 116 and the dual-mode near-field communications unit 118.

In accordance with one aspect, a first Fresnel lens 154-1 is located on an outer surface of the first wall. The first Fresnel lens 154-1 is configured to cover the first light sensor 106. A second Fresnel lens is 154-2 located on an outer surface of the second wall. The second Fresnel lens 154-2 is configured to cover the second light sensor 108. A third Fresnel lens 154-3 is located on an outer surface of the top wall. The third Fresnel lens 154-3 is configured to cover the third light sensor 110. Each Fresnel lens is configured to focus light impinging on the Fresnel lens onto the respective light sensor.

The light intensity monitor 104 includes a power connector implemented as IP68-rated connector 152. The IP68 rating ensures robust protection against dust and moisture ingress, from which a cable assembly can be extended. The IP68 connectors 152 are designed to establish electrical connections while providing protection against ingress of dust and water. The IP68 connectors 152 are used to connect two or more electrical devices or components, enabling them to communicate, transfer power, or signal to each other in environments where they might be exposed to harsh conditions.

The IP68 connector 152 provides power to a universal serial bus port 150 to supply the power to the monitor 104. The IP68 connector 152 is configured to supply power within the range of 5V-12V, in one example, over 2-wire data. 2-wire data typically refers to a communication interface or protocol that uses two physical wires to transmit and receive data. The protocol is commonly used in serial communication protocols where one wire is used for sending data (TX) and the other for receiving data (RX). In some cases, both wires may be used bi-directionally for half-duplex communication, where they take turns in sending and receiving signals. One of the most common examples of a 2-wire data system is the I2C protocol, which uses the SDA and the SCL for communication between multiple devices on the same bus.

The USB port 150 provides the flexibility to interface with either an internal USB connector 148 or an internal RS232 connector 144, depending on the available auxiliary equipment at the monitoring site. If a laptop or an embedded computer board equipped with a USB port is present, the cable assembly can be plugged into the USB connector 148. Conversely, if an RS232 logger is available, the connection is established via the RS232 connector 144. In scenarios where a physical communication interface is not requisite, any connector capable of accepting up to a 12V input can be utilized.

The RS232 connector 144 is a standard interface for serial communication, which is used to transmit data between a computer and a peripheral device, such as a modem or a serial printer. "RS" stands for Recommended Standard, and "232" is the number that was assigned to this interface in the standard. RS232 connectors are used in serial ports, which provide serial communication, meaning data is transmitted sequentially over a single wire.

The system 100 includes two DC-DC converters rated at 3.3V. The DC-DC 1 converter 138 and the DC/DC 2 converter 140 are configured to fetch the power from either the USB connector 148 or an internal RS232 connector 144. The DC-DC 1 converter 138 is configured to supply energy to the sensors (106, 108, and 110) and the microcontroller 124. The DC/DC 2 converter 140 is configured to powering the LTE and GPS modem 142. Communication between the LTE and GPS modem 142 and the microcontroller 124 is facilitated through a Universal Asynchronous Receiver/Transmitter (UART) interface.

UART is a hardware communication protocol that facilitates the transmission and reception of serial data. UART is used for serial communication and are an essential component in various communication protocols.

UART1 is configured to facilitate serial communication between the RS232 port 146 and the microcontroller 124. Communication between the LTE and GPS modem 142 and the microcontroller 124 is facilitated through UART2.

Figure 1D:
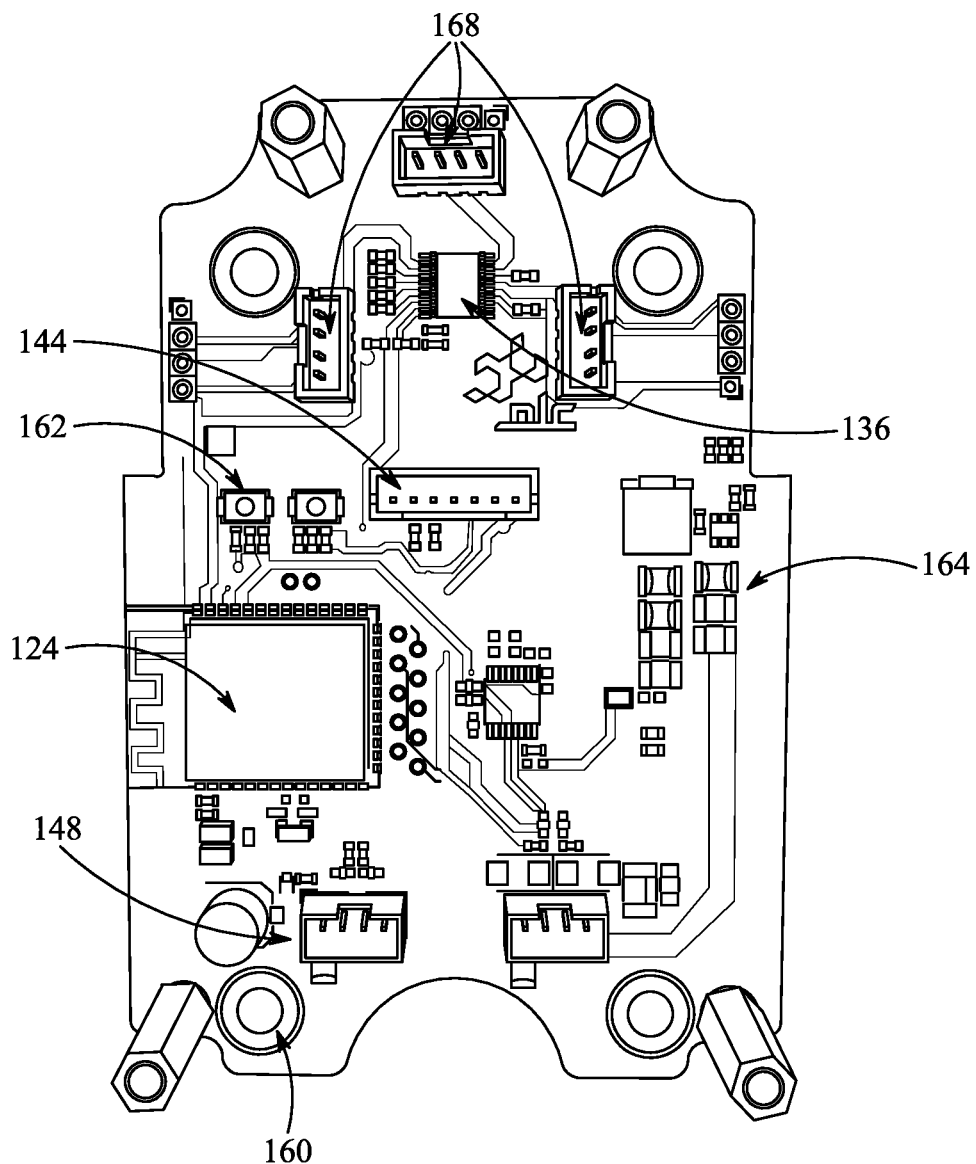
FIG. 1D shows the layout of the circuit board, according to certain embodiments.

FIG. 1D shows the layout of the circuit board, including the microcontroller 124, the internal USB connector 148 and the internal RS232 connector 144. The buttons labelled 162 are a button (on the left) for resetting the microcontroller 124 and a button (on the right) for changing the mode of the microcontroller 124 to a programming mode. Capacitors 164 are capacitors installed on the input power line. Connectors 168 connect to the sensor board for the light sensors (106, 108 and 110).

Figure 1E:
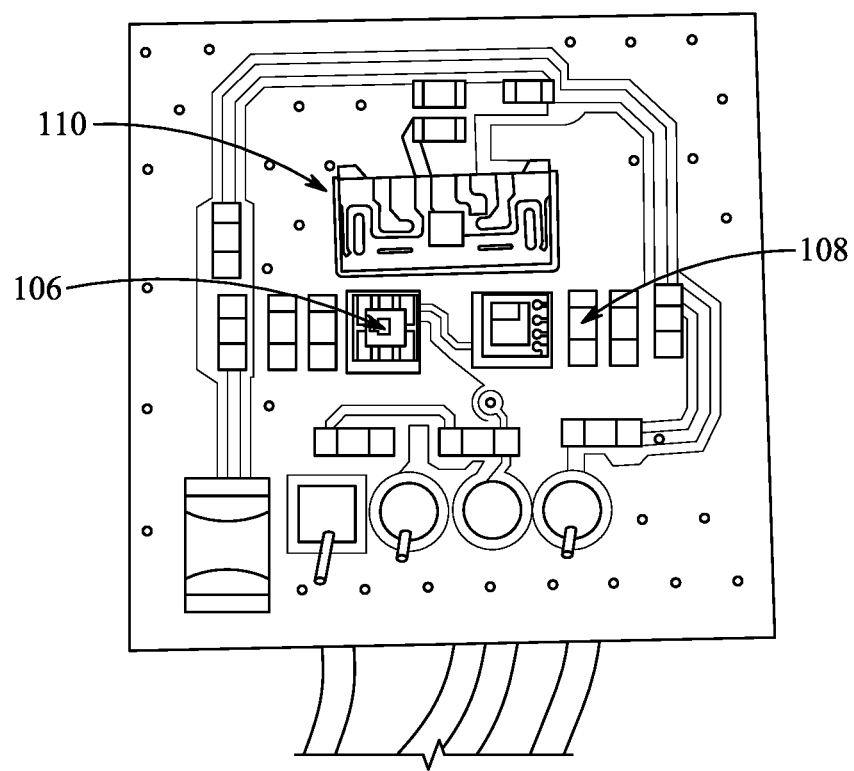
FIG. 1E illustrates the placement on the circuit board of the light sensors, according to certain embodiments.

FIG. 1E illustrates the placement on the circuit board of the light sensors, including the ambient light sensor 110, the low-voltage digital ambient light sensor 106 that converts light intensity to a digital signal output with the I2C interface and a low voltage I2C digital light sensor 108.

Figure 2A:
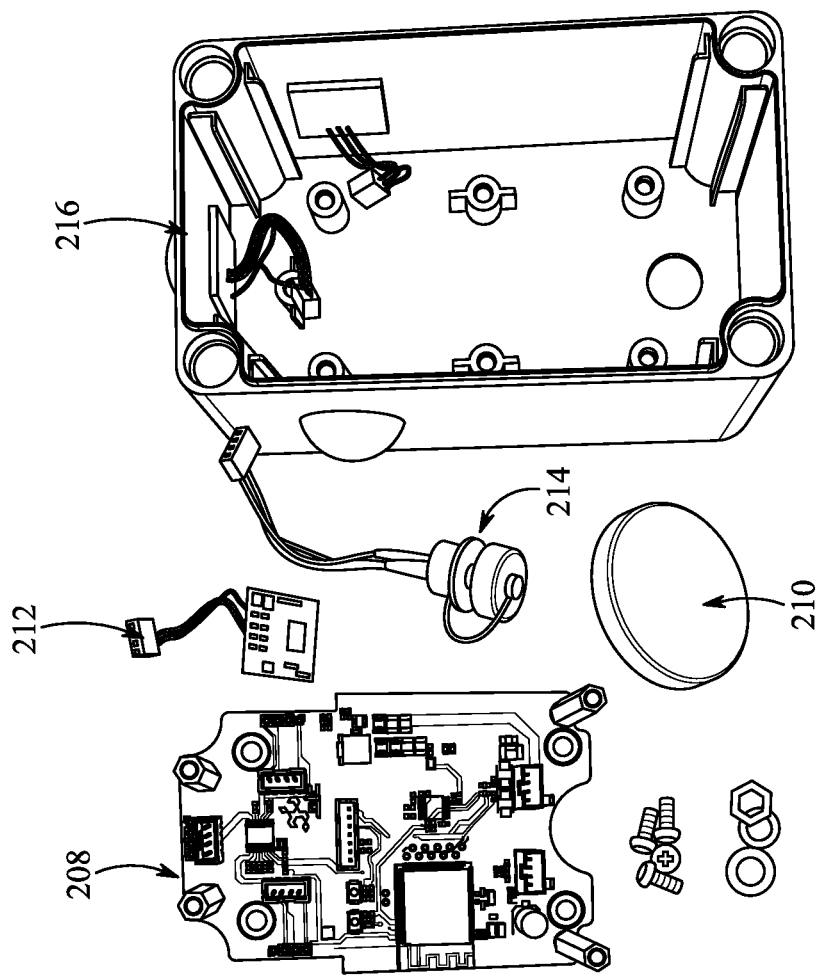
FIG. 2A shows various system components of the light intensity monitor, according to certain embodiments.
Figure 2A:
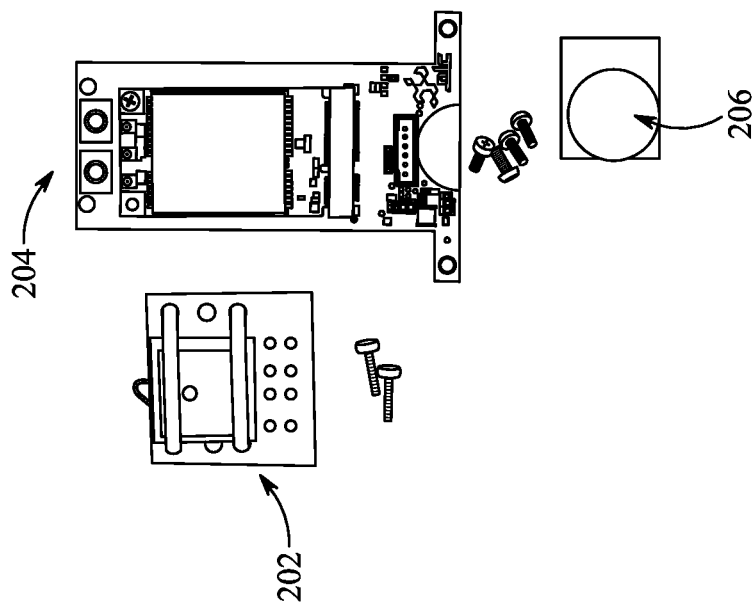

FIG. 2A shows various system components of the light intensity monitor. The system components include a GPS antenna 202, a Fresnel lens 206, a GPS antenna integrated with the LTE modem 204, a controller PCB 208, mounting magnets 210, an IP68 connector 214, a light sensor 212, and a waterproof housing 216.

Figure 2B:
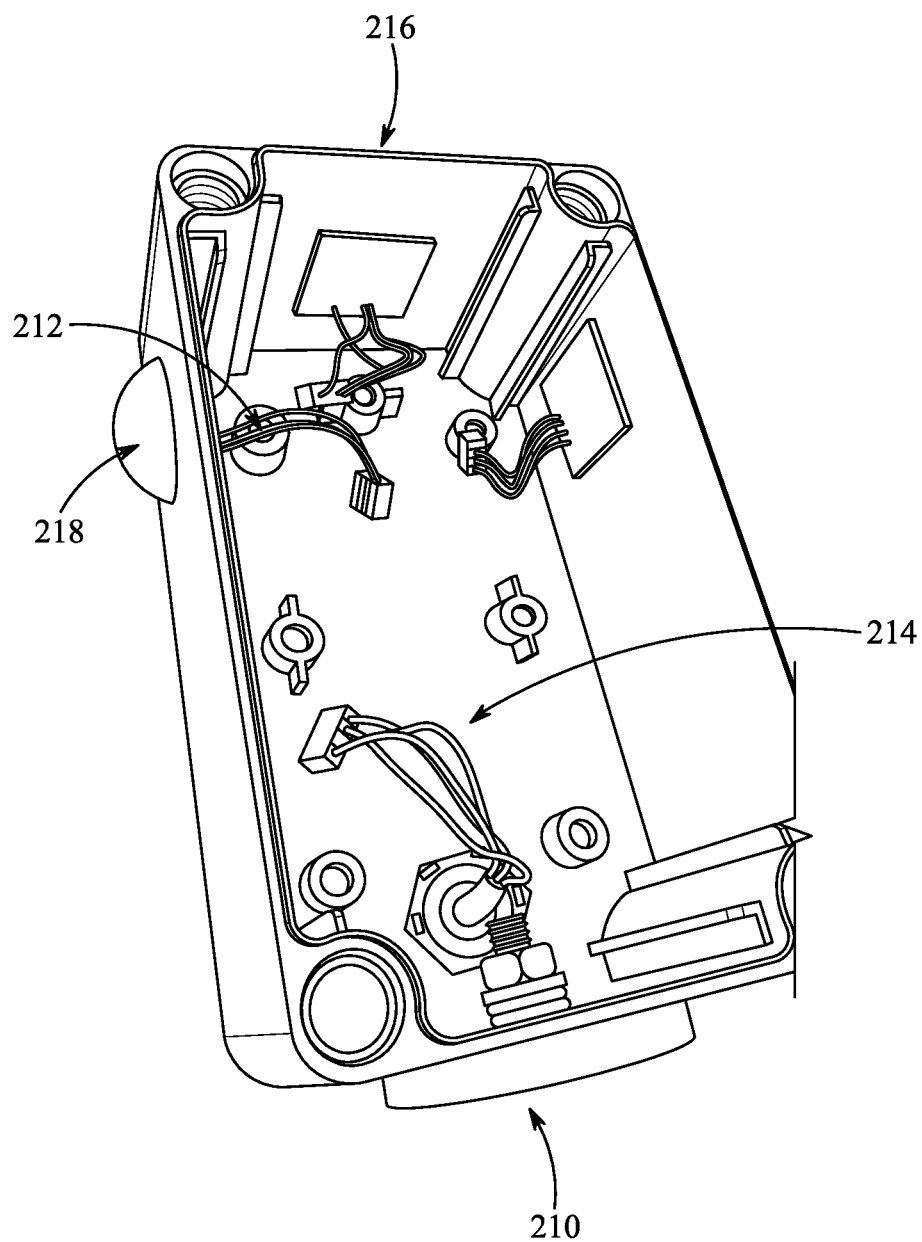
FIG. 2B shows the waterproof housing with a mounted magnet, according to certain embodiments.

FIG. 2B shows the waterproof housing 216 with a mounted magnet 210, sensor connectors 212 to connect with the light sensors, and a power connector 214. Initially, the waterproof housing 216 is prepared by creating openings and perforations for the placement of the Fresnel lenses, combinedly denoted by reference 218, the power connector 214, and the magnet 210. Then the Fresnel lenses 218, the sensor connectors 220, the power connector 214, and the magnet 210 are installed on the waterproof housing 216. The Fresnel lenses 218 are then securely attached to the waterproof housing 216 using an epoxy adhesive to ensure a watertight bond. There are two side-by-side mounting magnets 210 to stabilize the magnetic attachment of the waterproof housing 216 to the roof of the vehicle.

In one implementation, the waterproof housing 216 houses three light sensors, having connectors combinedly denoted by 212. The light sensors are positioned such that one sensor is oriented to face upwards, while the other two are aimed toward the left and right sides of the device, respectively. This structure permits the device to accurately sample light from multiple directions.

FIG. 2C-1 to FIG. 2C-4 show Fresnel lenses (218-1, 218-2 and 218-3) mounted on the waterproof housing 216 of the system. A Fresnel lens mounted on the right side of the first light sensor 106 is shown on the waterproof housing 216. A Fresnel lens 218-1 of the first light sensor 106 (mounted on left side of the waterproof housing 216), a Fresnel lens 218-2 of the second light sensor 108 (mounted on front side of the waterproof housing 216), a Fresnel lens 218-3 of the third light sensor 110 (mounted on top of the waterproof housing 216).

Figures 2, 2C:
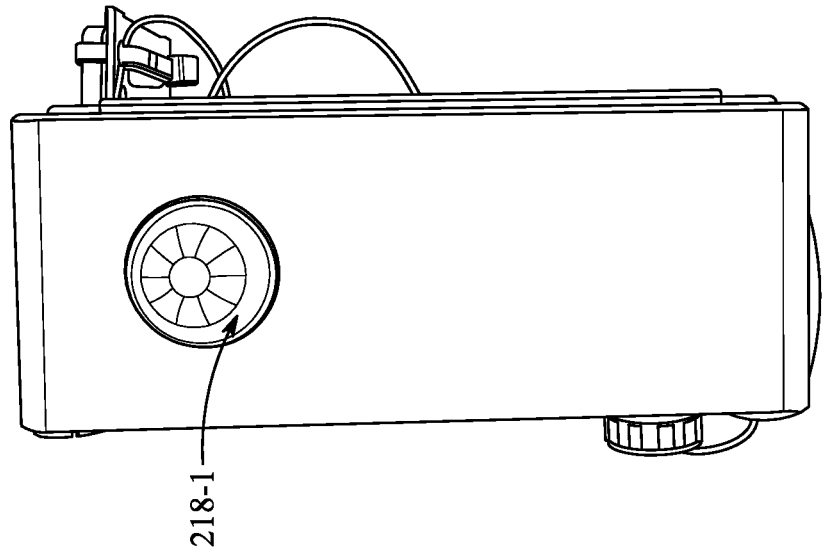
Figures 1, 2C:
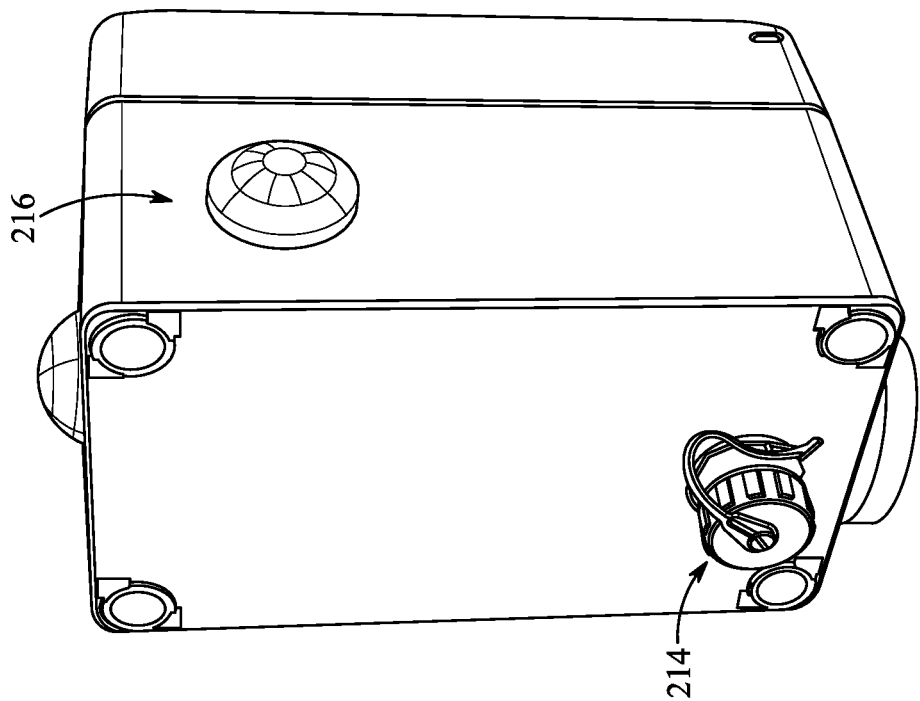
FIG. 2C-1 shows a Fresnel lenses mounted on a right side of a waterproof housing of the system, according to certain embodiments.
Figures 2, 2C, 3, 4:
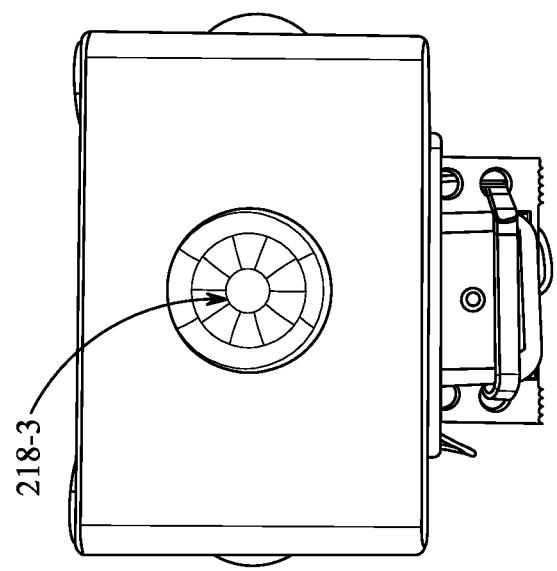
Figures 2, 2C, 3:
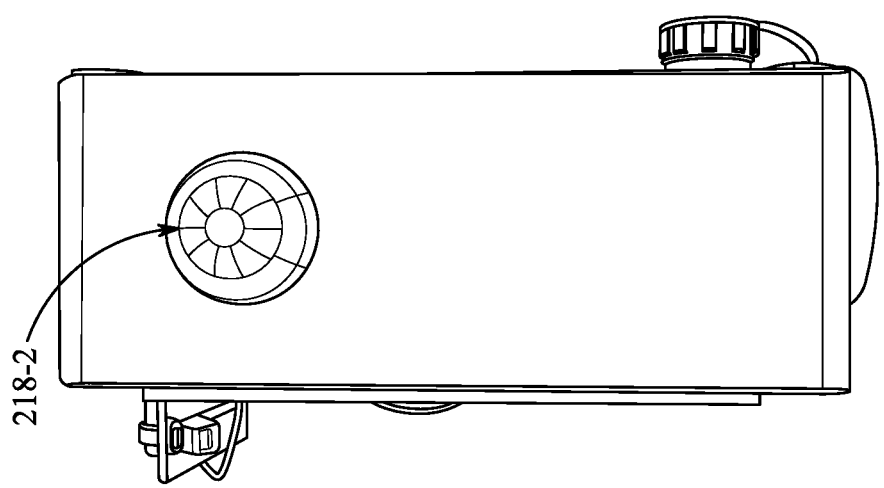
Figure 2D:
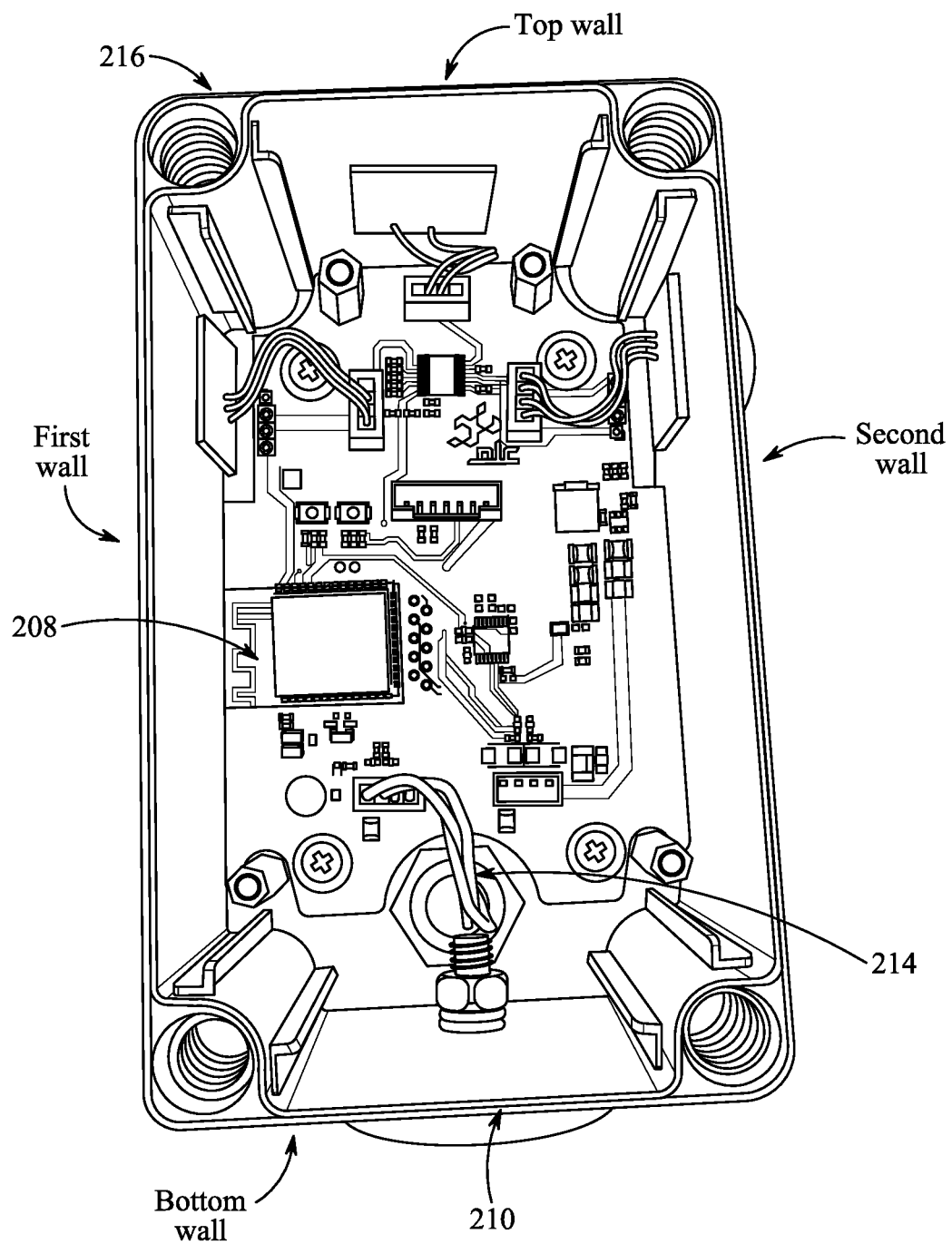
FIG. 2D depicts the waterproof housing with a circuit board mounted within according to certain embodiments.

FIG. 2D depicts the waterproof housing 216 with the circuit board 114 mounted within. The waterproof housing 216 having a first wall, a second wall, a third wall, and a fourth wall houses the light sensors 212, the magnet 210, the microcontroller 208, and the power connector 214.

Figure 2E:
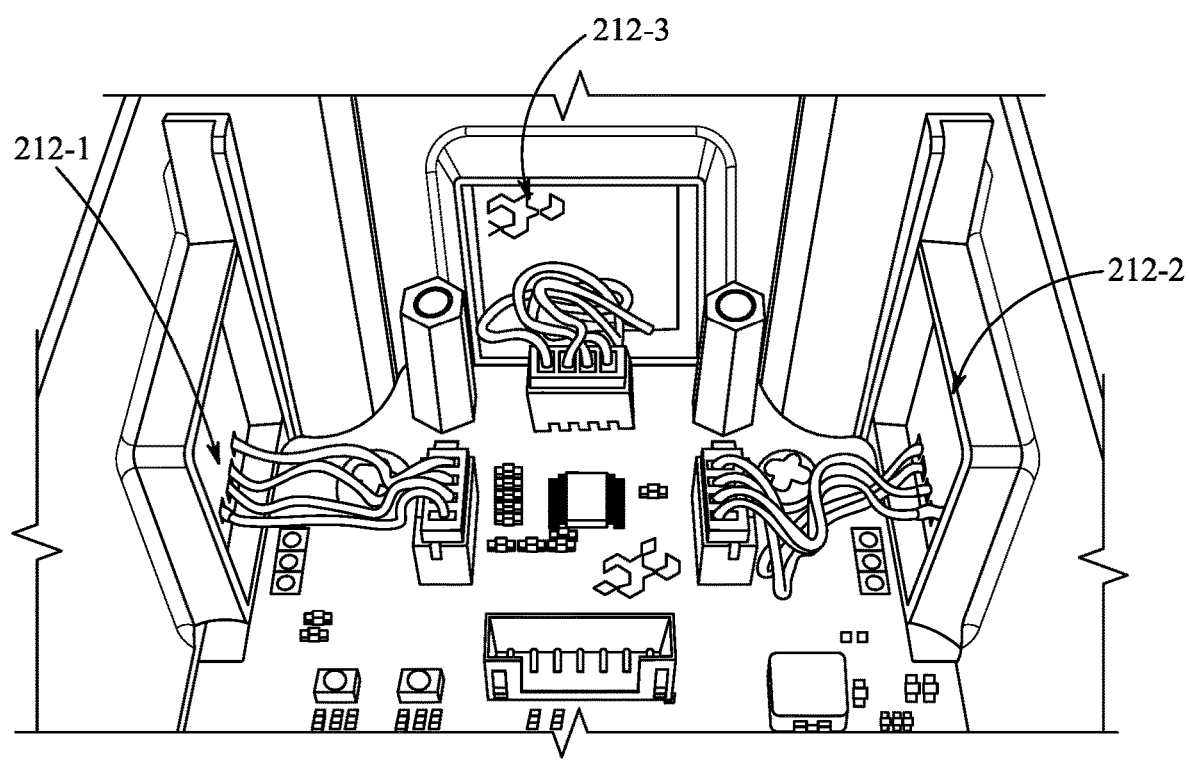
FIG. 2E depicts light sensors mounted within the waterproof housing, according to certain embodiments.

FIG. 2E depicts the light sensors with their connectors 212 mounted within the waterproof housing 216. The first light sensor connector 212-1 is mounted on the first sidewall, the second light sensor connector 212-2 is mounted on the second sidewall and the third light sensor connector 212-3 is mounted on the top wall. All three sensors are mounted near to the third wall on the respective sidewall or top wall.

Figures 1, 2F:
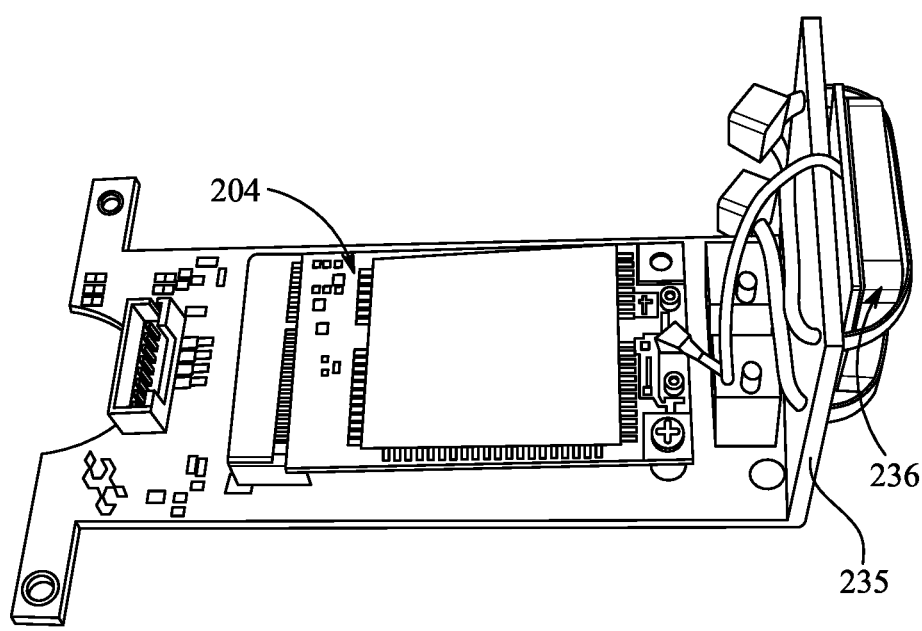
Figures 2, 2F:
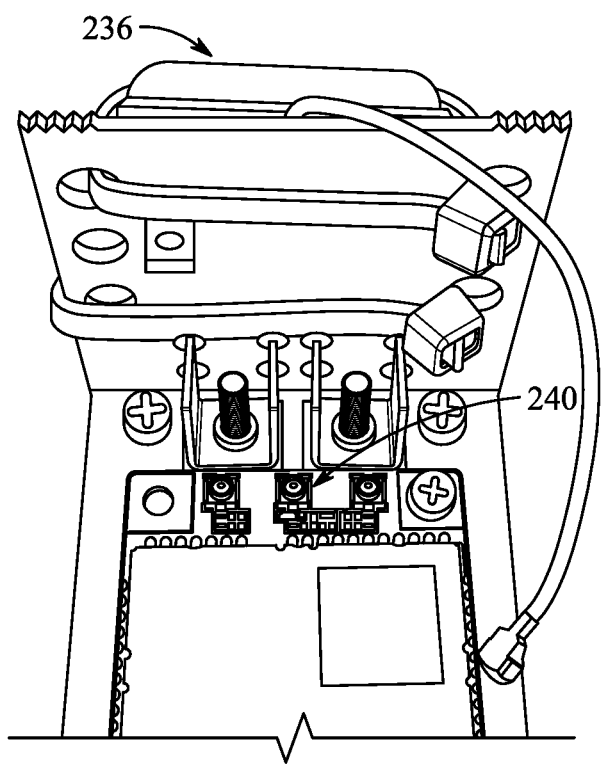

FIG. 2F-1 depicts a pictorial representation of the LTE modem 204 and GPS antenna 236. The support board 237 holds the GPS antenna 236.

FIG. 2F-2 depicts the GPS antenna 236 and a GPS connector 240.

Figure 2G:
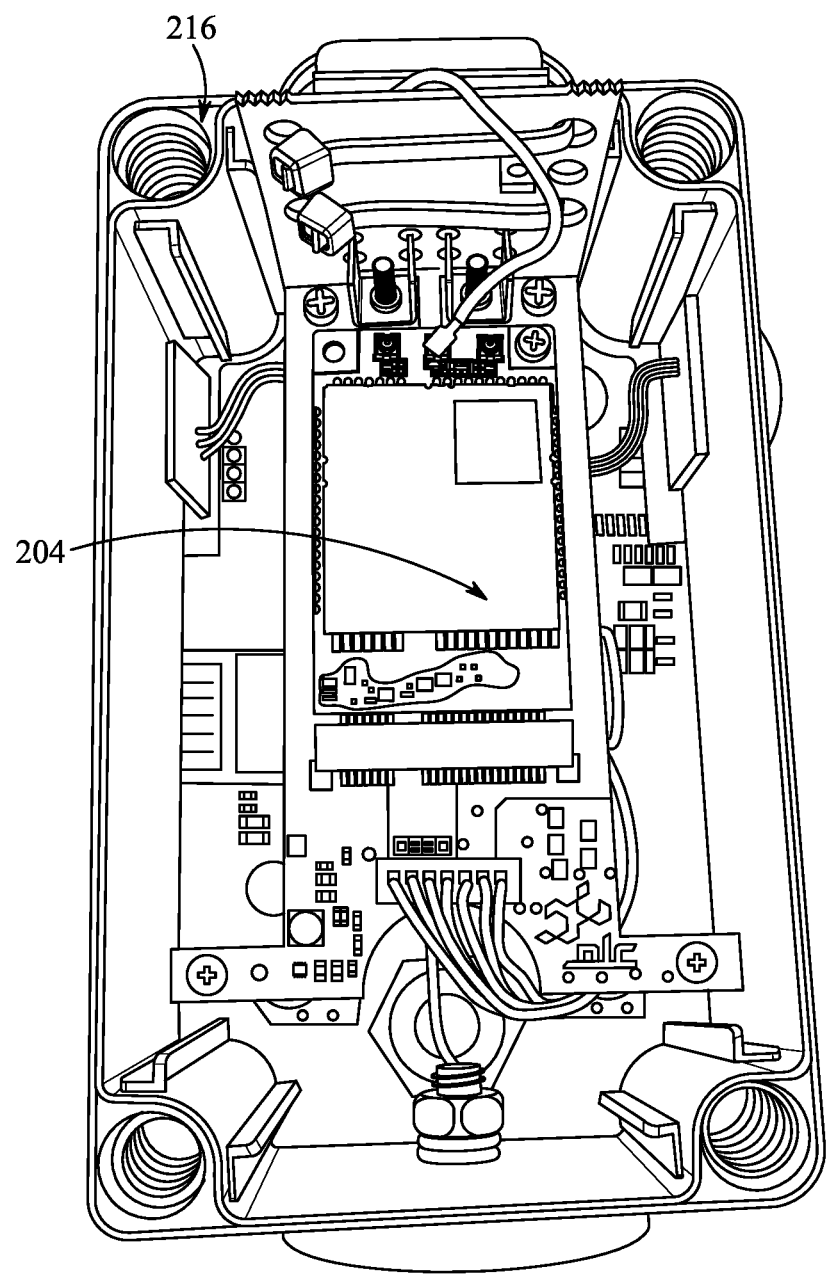
FIG. 2G depicts the LTE modem mounted on a circuit board within the waterproof housing, according to certain embodiments.

FIG. 2G depicts the GPS antenna integrated LTE modem 204 mounted on the circuit board 114 within the waterproof housing 216. Once the circuit board 114 is mounted within the waterproof housing by connection of the screw holes 216 with the screws, the LTE modem 204 is mounted and connected to the circuit board 114. In one example, the LTE modem is Quectel EC25-EU (manufactured by Quectel, Shanghai Business Park Phase III (Area B), Minhang District, Shanghai 200233 China).

Figures 1, 2H:
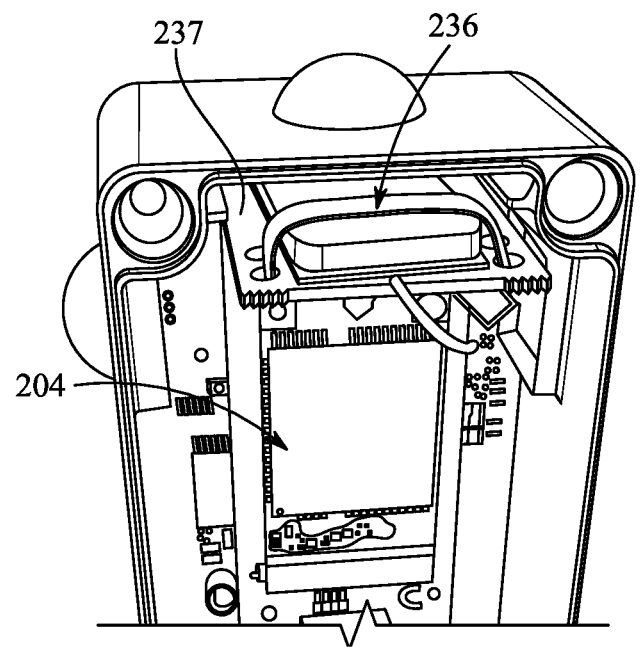
Figures 2, 2H:
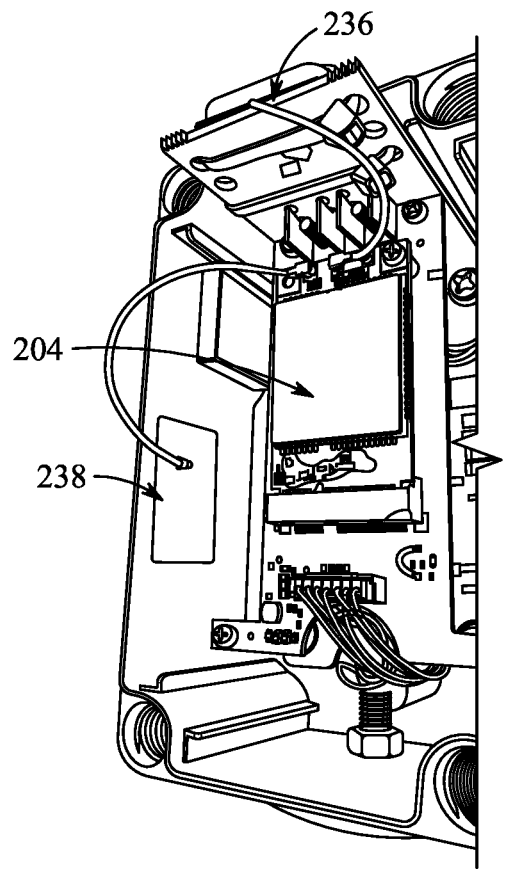

FIG. 2H-1 depicts the GPS antenna integrated with the LTE modem 204. The integrated LTE and GPS modem 204 and the GPS antenna 236 are mounted facing a vertical direction.

FIG. 2H-2 depicts an LTE antenna 238. The LTE antenna 238 is mounted on the first wall of the waterproof housing 216, in one implementation. The LTE and GPS antennal is connected to the LTE modem 204.

Figure 2I:
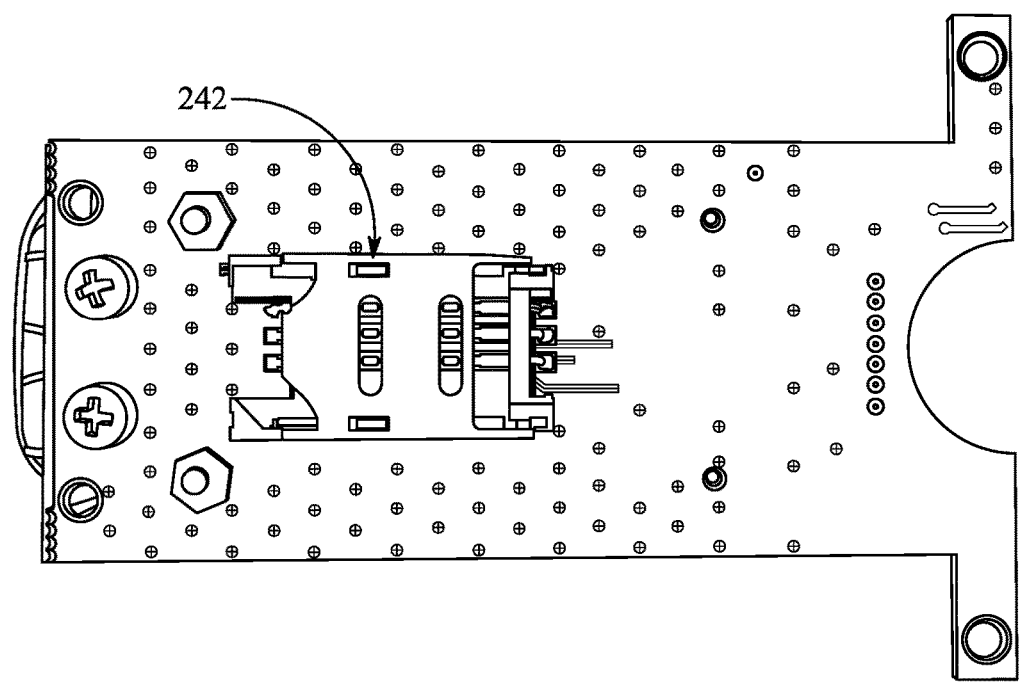
FIG. 2I depicts a SIM card slot position on the circuit board, according to certain embodiments.

FIG. 2I depicts a sim card slot 242 of the system 100. The sim card slot enables integration of a sim card with the system 100, allowing the establishment to of a cellular connection with the smart devices.

Figure 2J:
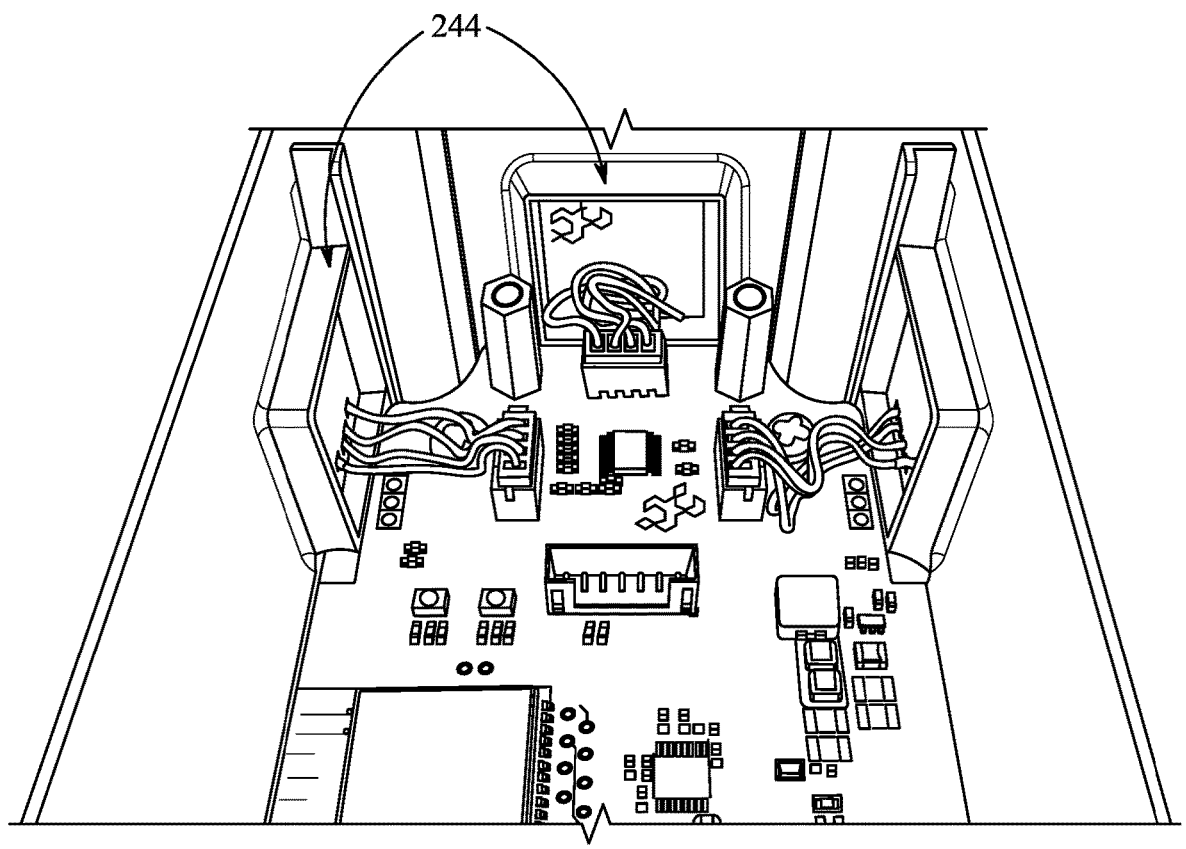
FIG. 2J shows Fresnel lenses from inside the waterproof housing, according to certain embodiments.

FIG. 2J shows the Fresnel lenses 218 from inside the waterproof housing 216.

Figure 3A:
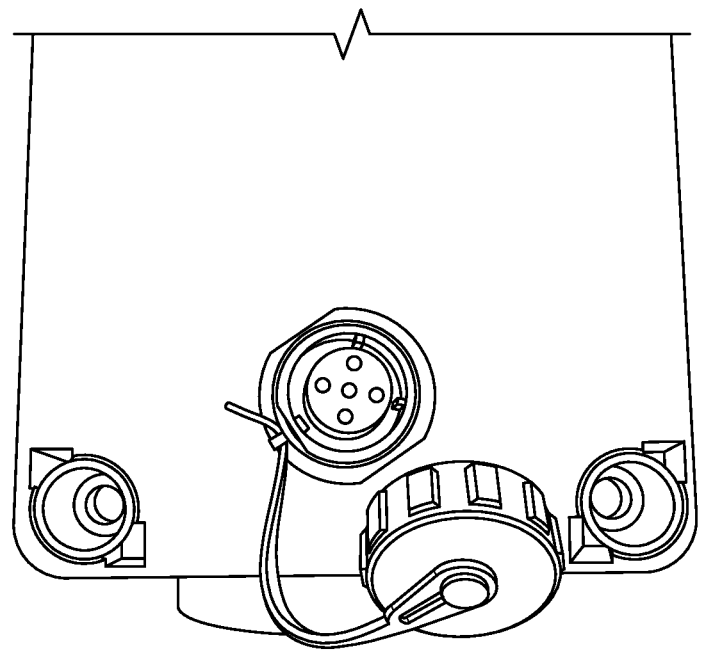
FIG. 3A depicts an external view of a power connector (IP68 connecter) mounted on the waterproof housing, according to certain embodiments.

FIG. 3A depicts an external view of the power connector 214 (IP68 connecter) mounted on the waterproof housing 216.

Figure 3B:
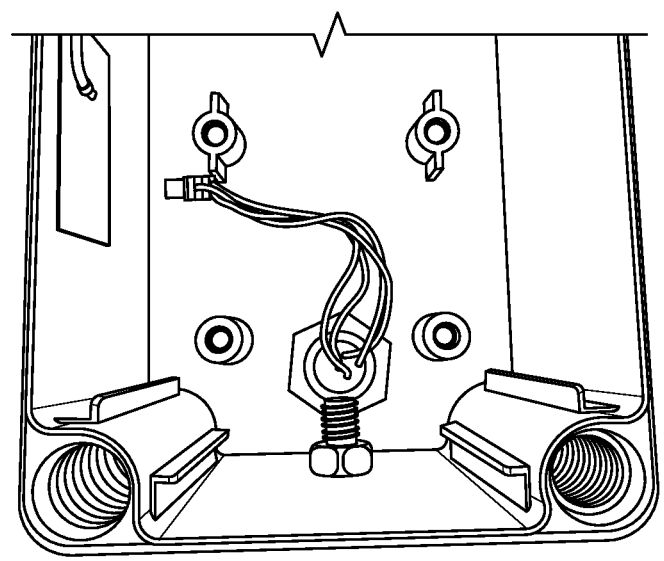
FIG. 3B depicts an internal view of a power connector (IP68 connecter) mounted on the waterproof housing, according to certain embodiments.

FIG. 3B depicts an internal view of the power connector 214 (IP68 connecter) mounted on the waterproof housing 216.

Figure 4B:
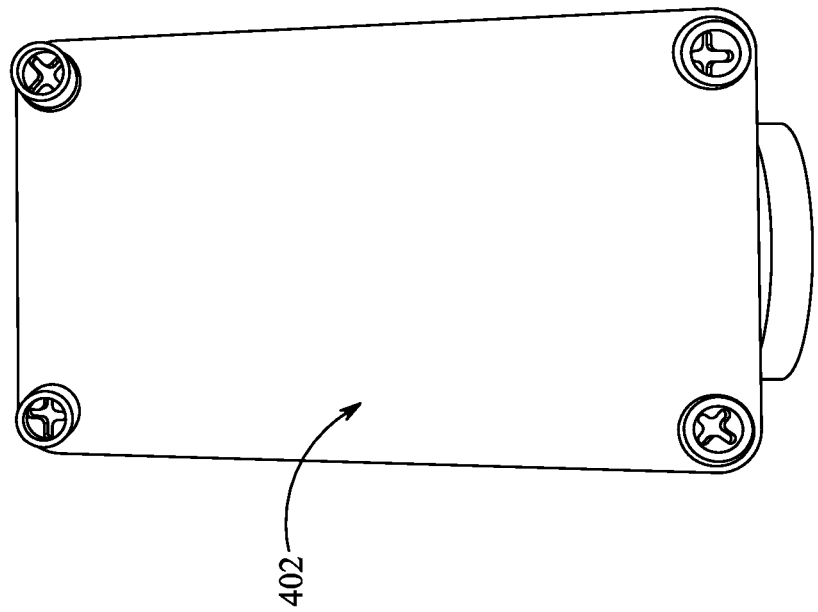
FIG. 4B depicts a lid with plastic screw details, according to certain embodiments. is an exemplary illustration of according to certain embodiments.
Figure 4A:
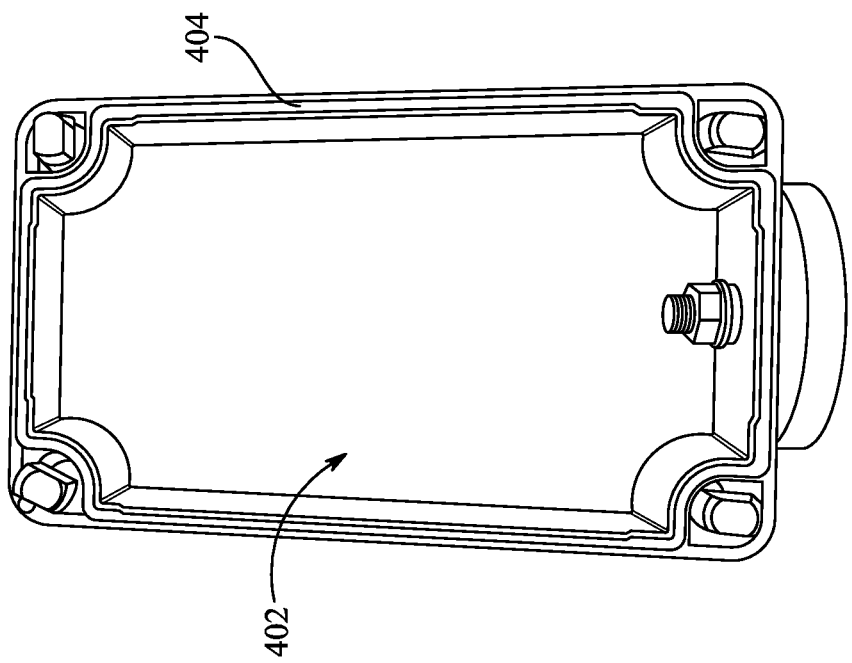
FIG. 4A depicts a lid with a sealing gasket, according to certain embodiments.

FIG. 4A depicts a lid 402 with a sealing gasket 404.

FIG. 4B depicts a lid 402 with plastic screw details.

The GPS antenna) is affixed within the unit using a printed circuit board (PCB) assembly, positioned to point skyward, optimizing the reception of signals. Additionally, a magnet 210 is affixed to the interior of the lid 402 of the waterproof housing, mirroring the attachment method utilized on the base of the waterproof housing. Upon securing the lid 402 with the supplied plastic screws, and the inclusion of a waterproof sealing gasket 404, the waterproof housing 216 attains an IP68 rating, signifying complete protection against dust ingress and the effects of immersion in water.

Figure 5:
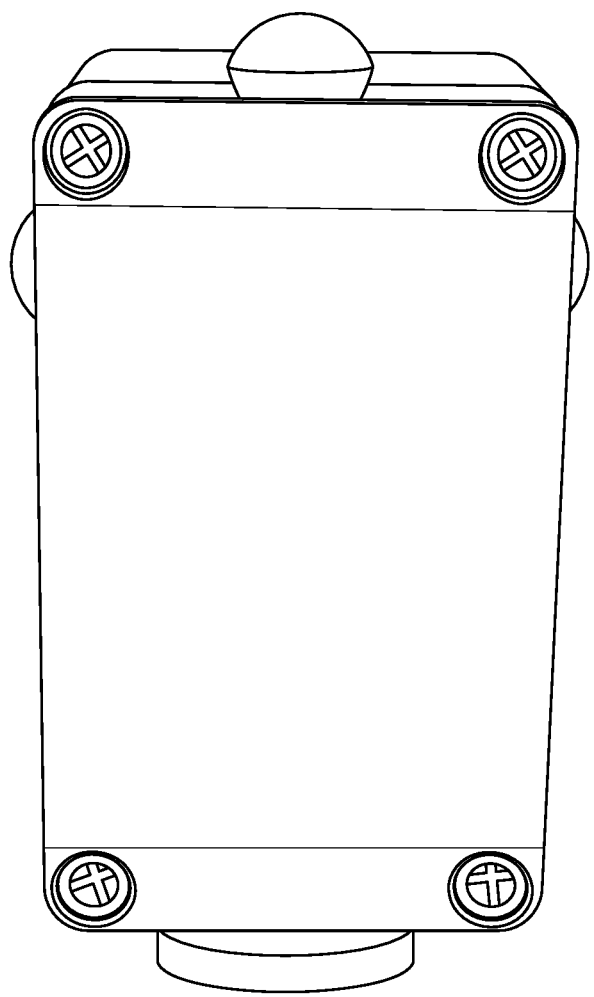
FIG. 5 illustrates an orientation of the light intensity monitor, attached to a vehicle's roof during the use, according to certain embodiments.

FIG. 5 illustrates an orientation of the light intensity monitor configured to be attached to the roof of the vehicle by the magnets during use.

Figure 6:
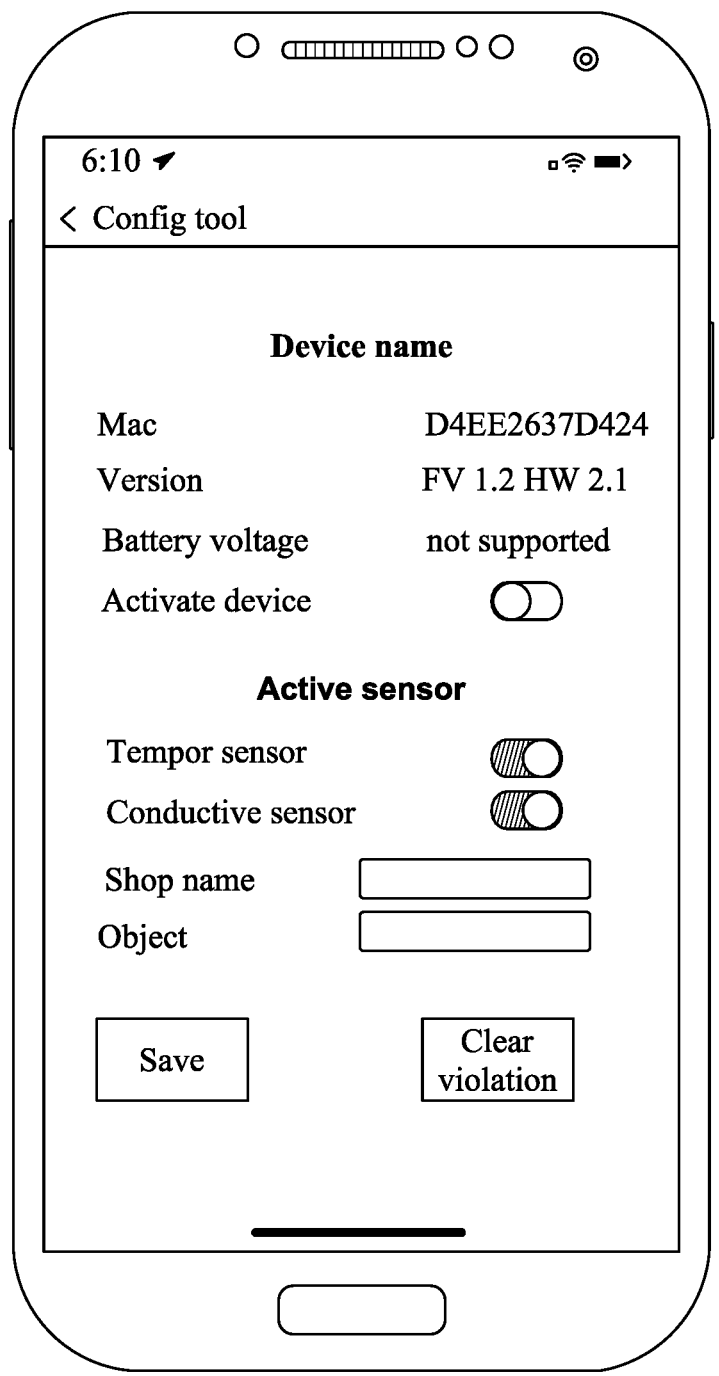
FIG. 6 illustrates a graphical user interface content of the light intensity monitoring application, according to certain embodiments.

FIG. 6 is a graphical user interface content of the light intensity monitoring application. The application is installed on a smart device, for example, a smartphone, to enable a user to set the mode of operation of the light intensity monitor 104. The screen content displays two sections. In the first section, details of the monitor including device ID, version of the application installed, battery voltage and switch to enable or disable the device are shown. In the second section, the parameters of the active settings can be configured by the user (the driver or passenger controlling the smart device in the vehicle).

Figure 7B:
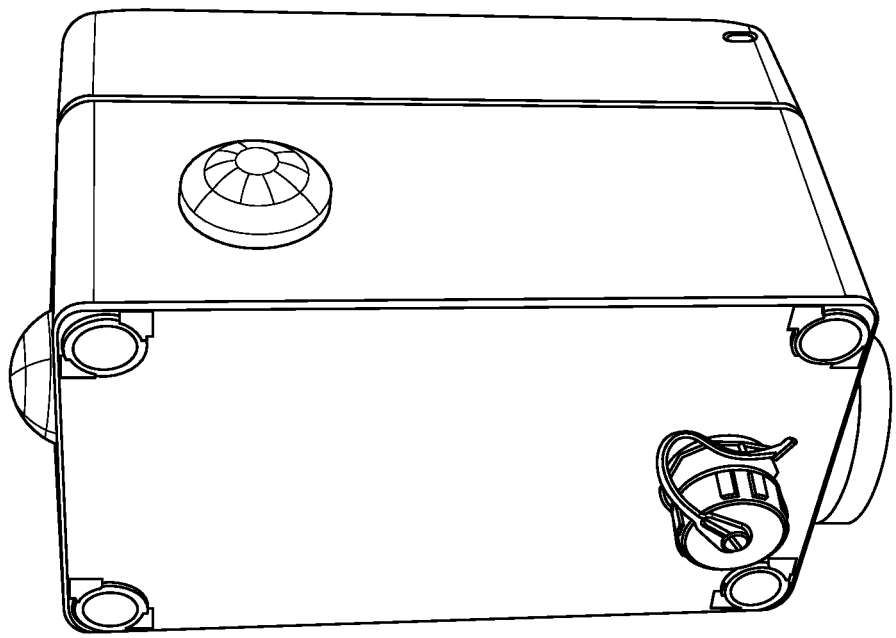
FIG. 7B depicts a rear view of the light intensity monitor, according to certain embodiments.
Figure 7A:
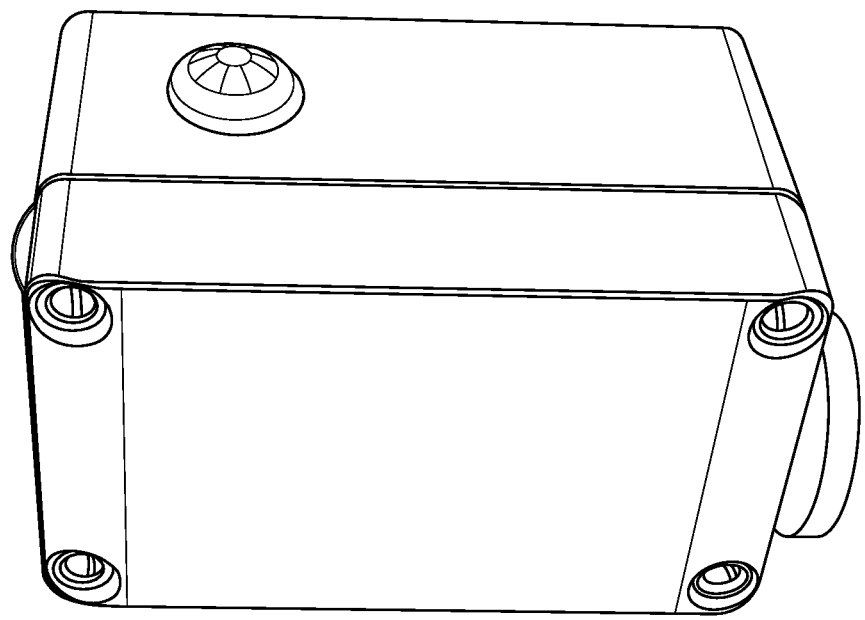
FIG. 7A depicts a front view of the light intensity monitor, according to certain embodiments.

FIG. 7A depicts a front view of the light intensity monitor.

FIG. 7B depicts a rear view of the light intensity monitor.

Figure 7D:
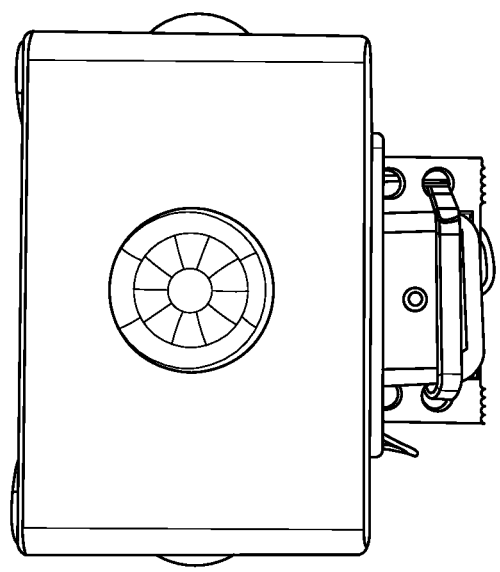
FIG. 7D depicts a top view of the light intensity monitor, according to certain embodiments.
Figure 7C:
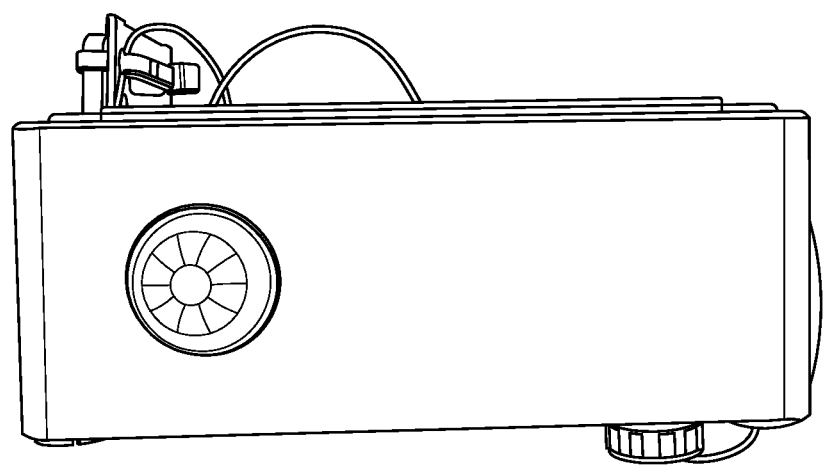
FIG. 7C depicts a side view of the light intensity monitor, according to certain embodiments.

FIG. 7C depicts a side view of the light intensity monitor.

FIG. 7D depicts a top view of the light intensity monitor.

Figure 8:
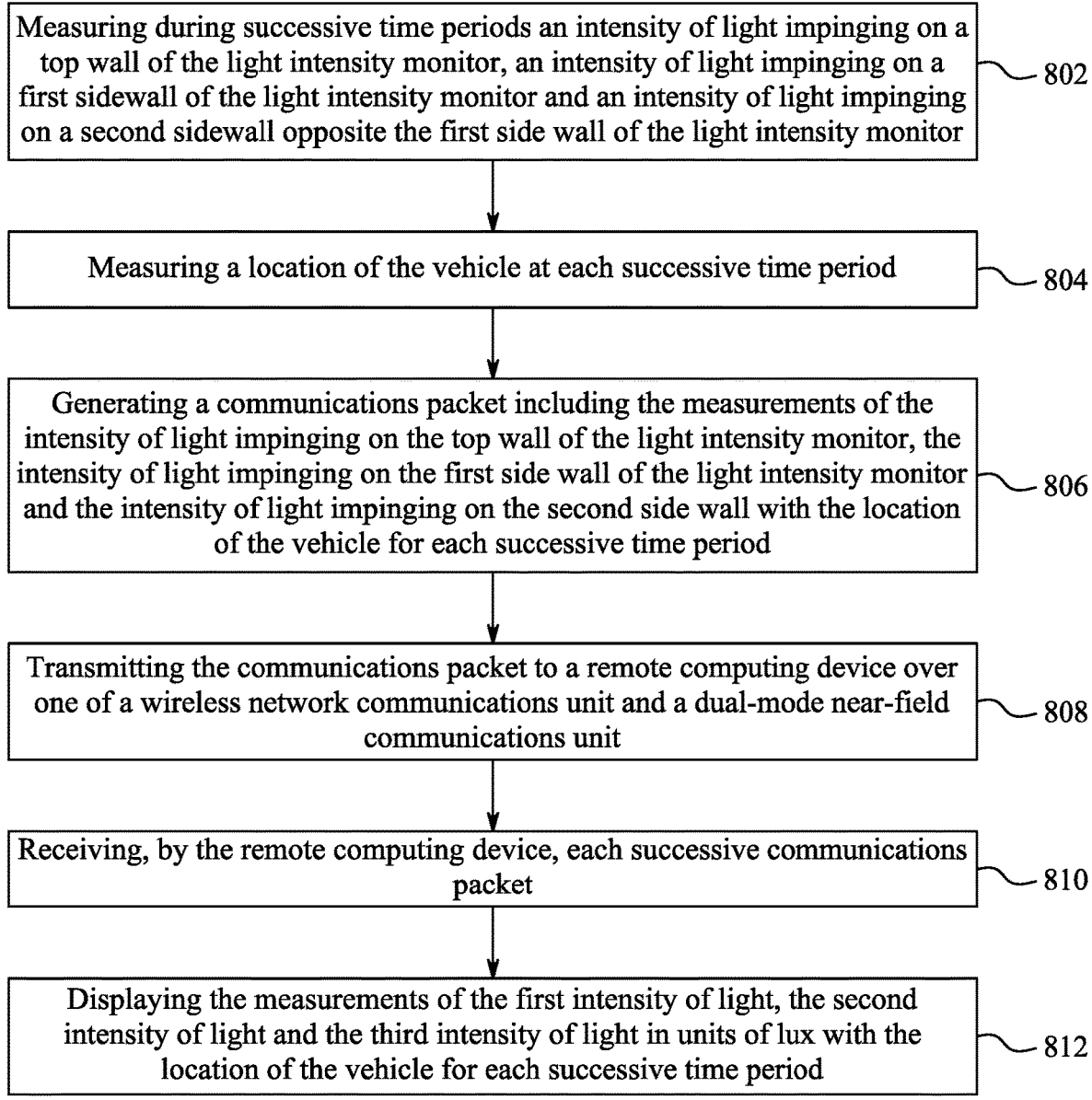
FIG. 8 is a flowchart of method steps implemented for monitoring light intensity along a roadway, according to certain embodiments.

FIG. 8 is a flowchart of method steps implemented for monitoring light intensity along a roadway. The method step 802 includes measuring an intensity of light impinging on a top wall of the light intensity monitor, an intensity of light impinging on a first sidewall of the light intensity monitor and an intensity of light impinging on a second sidewall opposite the first sidewall of the light intensity monitor. The light intensity is measured during successive time periods, with a light intensity monitor located on a roof of a vehicle traveling on the roadway. The first sidewall and the second sidewall are oriented on the roof of the vehicle perpendicular to a direction of travel of the vehicle.

The method step 804 includes measuring a location of the vehicle at each successive time period by the global positioning receiver.

The method step 806 includes generating a communications packet by the microcontroller 208 located in the light intensity monitor 104. The light intensity monitor 104 includes the measurements of the intensity of light impinging on the top wall of the light intensity monitor, the intensity of light impinging on the first sidewall of the light intensity monitor and the intensity of light impinging on the second sidewall with the location of the vehicle for each successive time period.

The method step 808 includes transmitting the communications packet to a remote computing device over one of a wireless network communications unit and a dual-mode near-field communications unit.

The method step 810 includes receiving each successive communications packet by the remote computing device.

The method step 812 includes displaying, on a mapping application of the remote computing device, the measurements of the first intensity of light, the second intensity of light and the third intensity of light in units of lux with the location of the vehicle for each successive time period.

The method further includes generating a time series compliance report by the remote computing device. The time series compliance report compares the lux levels at each location to expected lux levels stored in a database. The lux levels at each location record the intensity of street lighting at each location. The method further includes generating a faulty street light alert for each location at which the lux level of the street lighting is not equal to or greater than the expected lux level.

The method further includes generating a time series compliance report by the remote computing device. The time series compliance report compares the lux levels at each location to environmental light level standards for each location stored in a database. The method further includes generating an environmental light pollution alert for each location when the lux level of the environmental light is greater than the environmental light level standard for the location.

The system 100, depicted through FIG. 1-FIG. 8, includes the light intensity monitor 104. Initially, the monitor is installed within the waterproof housing 216. The system 100 is equipped with capabilities for multidirectional sensing and instant data recording. The system 100 offers a range of applications, as listed below. Then, the enclosed monitor 104 is attached to the vehicle roof. Lastly, the light intensity measurement operation is monitored using the light intensity monitoring application.

The system 100 is implemented for various applications as listed below.

Monitoring Light Pollution: The system 100 tracks and analyses the levels of light pollution throughout a city or specified region, by measuring and logging light intensity on both sides of a vehicle and above it, providing comprehensive coverage of the area's lighting conditions.

Maintenance and Oversight: The system 100 identifies non-functioning streetlights and other outdoor lighting fixtures. Areas where lights are not operating as expected will appear as unlit areas on a city-wide map of light intensity, allowing maintenance teams to identify and address these issues promptly.

Embodiments are illustrated with respect to FIG. 1 to FIG. 9. In a first embodiment, a light intensity monitoring system is described. The light intensity monitoring system for use with a vehicle travelling on a roadway, comprising: a waterproof housing having a top wall, four sidewalls and a bottom wall a first light sensor mounted within a first sidewall, wherein the first light sensor is configured to an intensity of light impinging on an outer surface of the first sidewall, a second light sensor mounted within a second sidewall, wherein the second sidewall is directly opposite the first sidewall, wherein the second light sensor is configured to measure an intensity of light impinging on an outer surface of the second sidewall, a third light sensor mounted within the top wall, wherein the third light sensor is configured to measure an intensity of light impinging on the first sensor from above the waterproof housing, wherein the first light sensor, the second light sensor and the third light sensor are each covered by a Fresnel lens mounted over the respective light sensor on the outer surface of the waterproof housing, a pair of magnets, mounted within the bottom wall, configured to attach the waterproof housing to a roof of the vehicle, a power connector mounted within a third sidewall near the bottom wall, and a circuit board mounted in the waterproof housing on the third sidewall above the power connector. The circuit board includes a wireless network communications unit, a dual-mode near-field communications unit, a global positioning receiver, an inter-integrated circuit (I2C) connected to each of the first light sensor, the second light sensor and the third light sensor, and a microcontroller operatively connected to the power connector, the wireless network communications unit, the dual-mode near-field communications unit, the global positioning receiver and the I2C circuit, wherein the microcontroller includes circuitry and a memory including programming instructions stored therein that, when executed by one or more processors, cause the one or more processors to: generate light sensor actuation signals; transmit the light sensor actuation signals to the I2C switch; receive the measurements of the first intensity of light, the second intensity of light and the third intensity of light over a first sampling time from the I2C switch; receive the location of the vehicle during the first sampling time from the global positioning receiver; generate a communications packet including the measurements of the first intensity of light, the second intensity of light, the third intensity of light and the location of the vehicle; and transmit the communications packet over one of the wireless network communications unit and the dual-mode near-field communications unit to a remote computing device; and a remote computing device including a mapping application, wherein the remote computing device is configured to receive the communications packet and display the measurements of the first intensity of light, the second intensity of light and the third intensity of light on a map of the mapping application.

In one aspect, the microcontroller is configured to continue to receive measurements of first intensity of light, the second intensity of light and the third intensity of light and the location over successive sampling times and transmit the measurements and the location of the vehicle for each successive sampling time in successive communications packets in real time, and the remote computing device is configured to receive the measurements and the location for each successive sampling time and display the measurements and the location for each successive sampling time on the map.

In one aspect, the remote computing device is a smart device which includes a light intensity monitoring computing application, the microcontroller is configured to transmit the successive communications packets by the dual-mode near-field communications transceiver to the smart device in real time, and the light intensity monitoring computing application is configured to display the map on a display screen of the smart device.

In one aspect, the light intensity monitoring system further comprising a remote server, wherein the microcontroller is configured to transmit the successive communications packets by the wireless network communications unit to the server, wherein the remote server is configured to receive the successive communications packets and transmit the successive communications packets to the remote computing device, wherein the remote computing device is wirelessly connected to the remote server, wherein the remote computing device includes a light intensity monitoring computing program, and the light intensity monitoring computing application is configured to display the map on a display screen of the remote computing device.

In one aspect, the circuit board is connected to a battery of the vehicle to receive power to operate the microcontroller, the first light sensor, the second light sensor, the third light sensor, the wireless network communications unit and the dual-mode near-field communications unit.

In one aspect, the wireless communications device is an LTE modem configured to communicate over any one of a 2G, a 3G, a 4G and a 5G wireless network.

In one aspect, the light intensity monitoring system further includes a database of expected light intensity measurements for each location along the roadway, wherein the light intensity measurements have units of lumens per square area (lux), wherein the remote computing device is further configured to generate a time series compliance report which compares the lux levels at each location to expected lux levels stored in the database.

In one aspect, the lux levels at each location record the intensity of street lighting at each location, and the compliance report further includes a faulty street light alert for each location at which the lux level of the street lighting is not equal to or greater than the expected lux level.

In one aspect, the database further includes environmental light level standards for each location, the lux levels at each location record the environmental light level at each location, and the compliance report further includes an environmental light pollution alert for each location when the lux level of the environmental light level is greater than the environmental light level standard for the location.

In another exemplary aspect, a light intensity monitor for measuring environmental light along a roadway is described. The light intensity monitor includes a waterproof housing having a top wall, four sidewalls and a bottom wall, a first light sensor mounted within a first sidewall, wherein the first light sensor is configured to an intensity of light impinging on an outer surface of the first sidewall, a second light sensor mounted within a second sidewall, wherein the second sidewall is directly opposite the first sidewall, wherein the second light sensor is configured to measure an intensity of light impinging on an outer surface of the second sidewall, a third light sensor mounted within the top wall, wherein the third light sensor is configured to measure an intensity of light impinging on the first sensor from above the waterproof housing, a pair of magnets mounted in the bottom wall, wherein the pair of magnets are configured to attach the waterproof housing to a roof of a vehicle, a power connector mounted within a third sidewall near the bottom wall, a circuit board mounted in the waterproof housing on the third sidewall above the power connector, wherein the circuit board includes: a wireless network communications unit, a dual-mode near-field communications unit, a global positioning receiver, an inter-integrated circuit (I2C) connected to each of the first light sensor, the second light sensor and the third light sensor, a microcontroller operatively connected to the power connector, the wireless network communications unit, the dual-mode near-field communications unit, the global positioning receiver and the I2C circuit, wherein the microcontroller includes circuitry and a memory including programming instructions stored therein that, when executed by one or more processors, cause the one or more processors to: receive the measurements of the first intensity of light, the second intensity of light and the third intensity of light over a first sampling time from the I2C switch, receive the location of the vehicle during the first sampling time from the global positioning receiver, generate a communications packet including the measurements of the first intensity of light, the second intensity of light, the third intensity of light and the location of the vehicle, and transmit the communications packet to a remote computing device over one of the wireless network communications unit and the dual-mode near-field communications unit.

The light intensity monitor includes three light sensors. A first light sensor is mounted within a first sidewall. The first light sensor is configured to an intensity of light impinging on an outer surface of the first sidewall. A second light sensor mounted within a second sidewall. The second sidewall is directly opposite the first sidewall. The second light sensor is configured to measure an intensity of light impinging on an outer surface of the second sidewall. A third light sensor mounted within the top wall. The third light sensor is configured to measure an intensity of light impinging on the first sensor from above the waterproof housing. The first light sensor, the second light sensor and the third light sensor are each covered by a Fresnel lens mounted over the respective light sensor on the outer surface of the waterproof housing.

The light intensity monitor includes a pair of magnets, mounted within the bottom wall, configured to attach the waterproof housing to a roof of the vehicle, a power connector mounted within a third sidewall near the bottom wall, and a circuit board mounted in the waterproof housing on the third sidewall above the power connector. The circuit board includes a wireless network communications unit, a dual-mode near-field communications unit, a global positioning receiver, an inter-integrated circuit (I2C) connected to each of the first light sensor, the second light sensor and the third light sensor, and a microcontroller operatively connected to the power connector, the wireless network communications unit, the dual-mode near-field communications unit, the global positioning receiver and the I2C circuit.

The microcontroller includes circuitry and a memory including programming instructions stored therein that, when executed by one or more processors, cause the one or more processors to generate light sensor actuation signals, transmit the light sensor actuation signals to the I2C switch, receive the measurements of the first intensity of light, the second intensity of light and the third intensity of light over a first sampling time from the I2C switch, receive the location of the vehicle during the first sampling time from the global positioning receiver, generate a communications packet including the measurements of the first intensity of light, the second intensity of light, the third intensity of light and the location of the vehicle, and transmit the communications packet over one of the wireless network communications unit and the dual-mode near-field communications unit.

In an aspect, the light intensity monitor further comprising: a first Fresnel lens located on an outer surface of the first wall, wherein the first Fresnel lens is configured to cover the first light sensor, a second Fresnel lens located on an outer surface of the second wall, wherein the second Fresnel lens is configured to cover the second light sensor, a third Fresnel lens located on an outer surface of the top wall, wherein the third Fresnel lens is configured to cover the third light sensor, wherein each Fresnel lens is configured to focus light impinging on the Fresnel lens onto the respective light sensor.

The power connector is configured to connect to a battery of the vehicle to receive power to operate the microcontroller, the first light sensor, the second light sensor, the third light sensor, the wireless network communications unit and the dual-mode near-field communications unit. The pair of magnets are neodymium magnets. The light intensity measurements have units of lumens per square area (lux).

In an aspect, the light intensity monitor further comprising: a removable lid located on a fourth sidewall, four threaded channels located in the waterproof housing, wherein the waterproof housing is configured with four corners, wherein each corner includes a threaded channel, four screw holes located in the removable lid, wherein each screw hole is configured to align with one of the four threaded channels, four screws, wherein each screw is configured to be inserted through a screw hole into a respective one of the four threaded channels to mate the removable lid to the waterproof housing, and a gasket located on the waterproof housing, wherein the gasket is configured to provide a waterproof seal between the lid and a contacting surface of the waterproof housing.

In an aspect, the light intensity monitor further comprises a support board mounted with the waterproof housing perpendicular to the circuit board and beneath the top wall, wherein the support board is configured to support the global positioning receiver such that an internal antenna of the global positioning receiver is oriented to face towards the top wall.

In an aspect, the light intensity monitor further comprising a first DC/DC converter connected to the power connector, wherein the first DC/DC converter is configured to provide low power DC voltage to the microcontroller and light sensors, and a second DC/DC converter connected to the power connector, wherein the second DC/DC converter is configured to provide high power DC voltage to the wireless network communications unit and the global positioning receiver.

In another exemplary embodiment, a method for monitoring light intensity along a roadway is described. The method includes measuring during successive time periods, with a light intensity monitor located on a roof of a vehicle travelling on the roadway, an intensity of light impinging on a top wall of the light intensity monitor, an intensity of light impinging on a first sidewall of the light intensity monitor and an intensity of light impinging on a second sidewall opposite the first sidewall of the light intensity monitor. The first sidewall and the second sidewall are oriented on the roof of the vehicle perpendicular to a direction of travel of the vehicle, measuring, by a global positioning sensor, a location of the vehicle at each successive time period, generating, by a microcontroller located in the light intensity monitor, a communications packet including the measurements of the intensity of light impinging on the top wall of the light intensity monitor, the intensity of light impinging on the first sidewall of the light intensity monitor and the intensity of light impinging on the second sidewall with the location of the vehicle for each successive time period, transmitting the communications packet to a remote computing device over one of a wireless network communications unit and a dual-mode near-field communications unit, receiving, by the remote computing device each successive communications packet, and displaying, on a mapping application of the remote computing device, the measurements of the first intensity of light, the second intensity of light and the third intensity of light in units of lux with the location of the vehicle for each successive time period.

In an aspect, the method comprising generating, by the remote computing device, a time series compliance report which compares the lux levels at each location to expected lux levels stored in a database, wherein the lux levels at each location record the intensity of street lighting at each location, and generating a faulty street light alert for each location at which the lux level of the street lighting is not equal to or greater than the expected lux level.

In an aspect, the method comprising generating, by the remote computing device, a time series compliance report which compares the lux levels at each location to environmental light level standards for each location stored in a database, and generating an environmental light pollution alert for each location when the lux level of the environmental light is greater than the environmental light level standard for the location.

Figure 9:
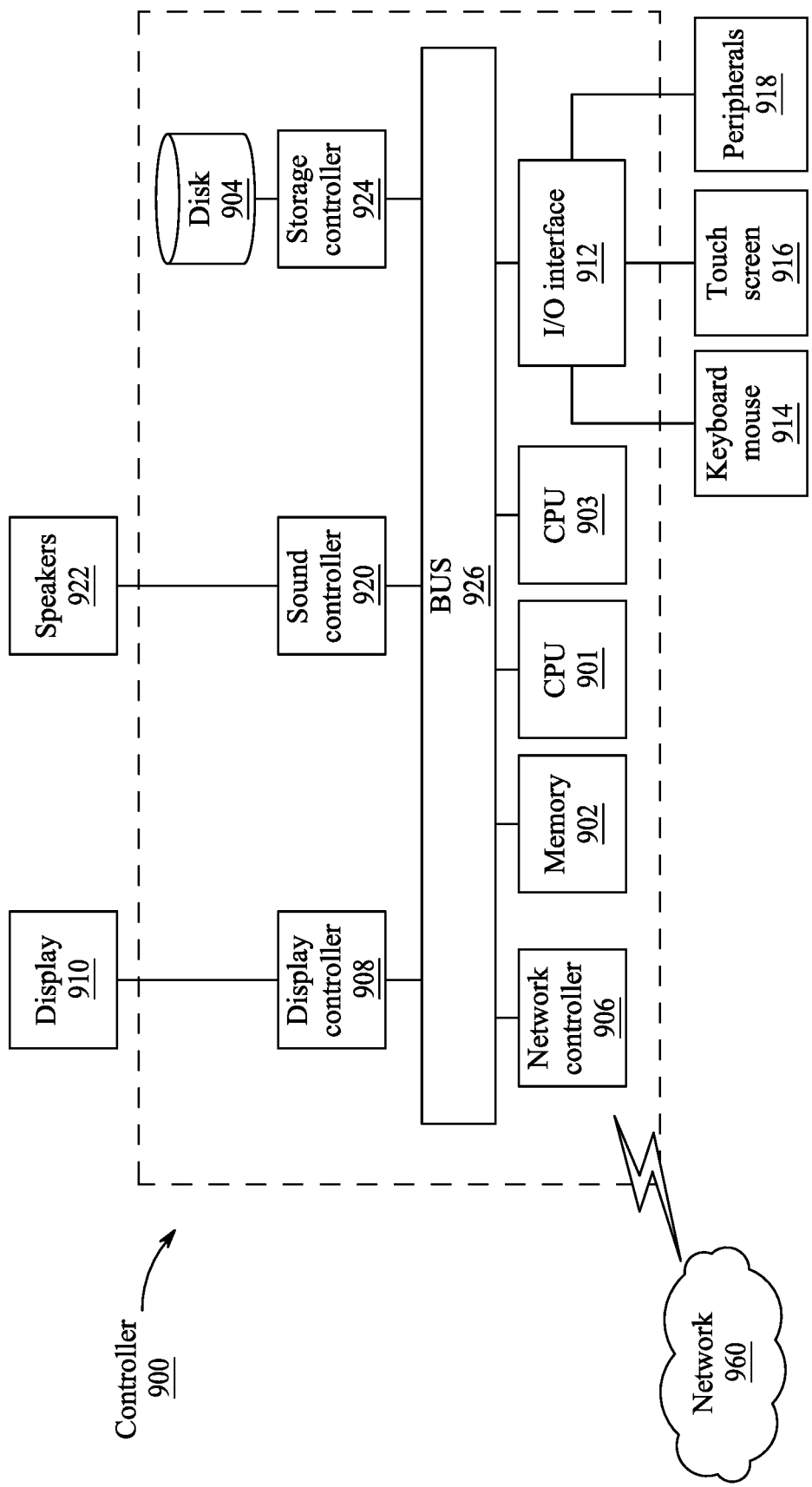
FIG. 9 is an illustration of a non-limiting example of details of computing hardware used in the computing system, according to certain embodiments.

Next, further details of the hardware description of the computing environment according to exemplary embodiments is described with reference to FIG. 9. In FIG. 9, a controller 900 is described as representative of the microcontroller 124 of FIG. 1B in which the microcontroller is a computing device which includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 9, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
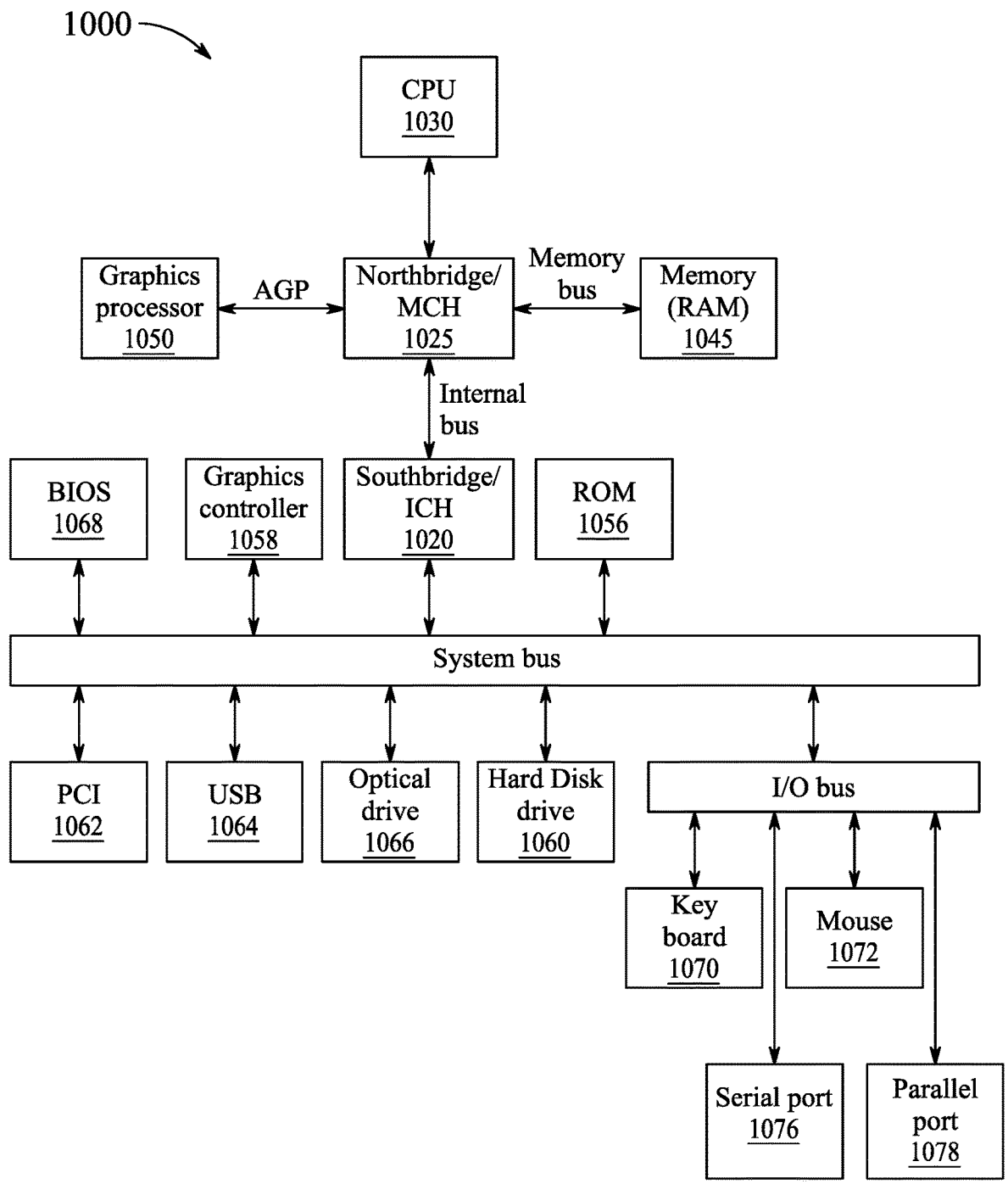
FIG. 10 is an exemplary schematic diagram of a data processing system used within the computing system, according to certain embodiments.

FIG. 10 shows a schematic diagram of a data processing system 1000, according to certain aspects of the present disclosure, for performing the functions of the exemplary aspects. The data processing system 1000 is an example of a computer in which code or instructions implementing the processes of the illustrative aspects may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
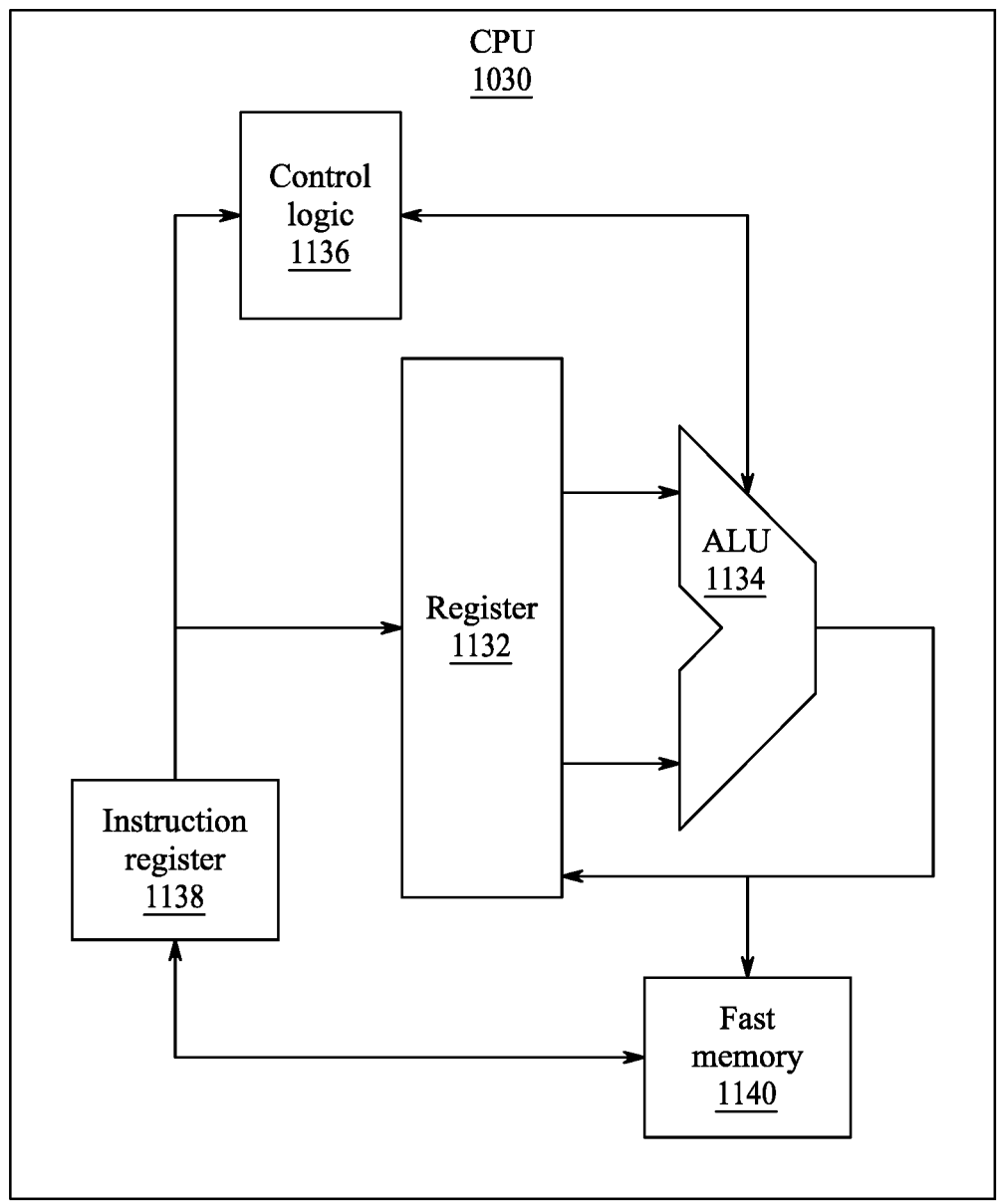
FIG. 11 is an exemplary schematic diagram of a processor used with the computing system, according to certain embodiments.

For example, FIG. 11 shows one implementation of CPU 1030, according to an aspect of the present disclosure. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 888 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
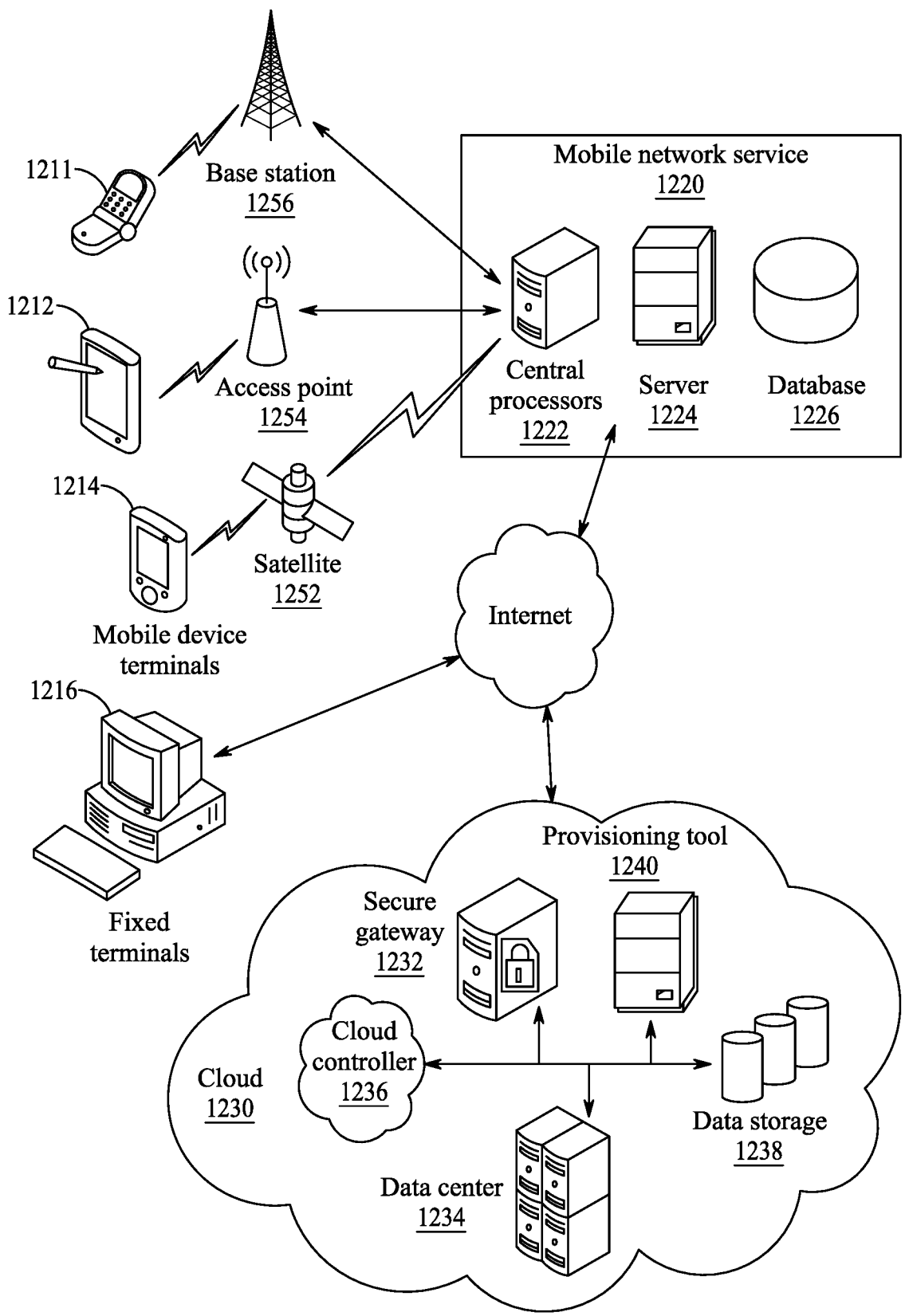
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing as shown in FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A light intensity monitoring system for use with a vehicle travelling on a roadway, comprising:
   a waterproof housing having a top wall, four sidewalls and a bottom wall;
   a first light sensor mounted in an aperture in a first sidewall, wherein the first light sensor is configured to measure a lux value of an intensity of light impinging on an outer surface of the first sidewall;
   a second light sensor mounted in an aperture in a second sidewall, wherein the second sidewall is directly opposite the first sidewall, wherein the second light sensor is configured to measure a lux value of an intensity of light impinging on an outer surface of the second sidewall;
   a third light sensor mounted in an aperture in the top wall, wherein the third light sensor is configured to measure a lux value of an intensity of light impinging on the first sensor from above the waterproof housing, wherein the first light sensor, the second light sensor and the third light sensor are each covered by a Fresnel lens mounted over the respective light sensor on the outer surface of the waterproof housing;
   a pair of magnets mounted within the bottom wall, wherein the pair of magnets are configured to attach the waterproof housing to a roof of the vehicle;
   a power connector mounted within a third sidewall proximal to the bottom wall;
   a circuit board mounted in the waterproof housing on the third sidewall above the power connector, wherein the circuit board includes:
      a wireless network communications unit;
      a dual-mode near-field communications unit;
      a global positioning receiver;
      an inter-integrated circuit (I2C) connected to each of the first light sensor, the second light sensor and the third light sensor;
      a microcontroller operatively connected to the power connector, the wireless network communications unit, the dual-mode near-field communications unit, the global positioning receiver and the I2C circuit, wherein the microcontroller includes circuitry and a memory including programming instructions stored therein that, when executed by one or more processors, cause the one or more processors to:
         generate light sensor actuation signals;
         transmit the light sensor actuation signals to the I2C switch;
         receive the lux values of first intensity of light, the second intensity of light and the third intensity of light over a first sampling time from the I2C switch;
         receive the location of the vehicle during the first sampling time from the global positioning receiver;
         generate a communications packet including the lux values of the first intensity of light, the second intensity of light, the third intensity of light and the location of the vehicle; and
         transmit the communications packet over one of the wireless network communications unit and the dual-mode near-field communications unit to a remote computing device including a mapping application, wherein the remote computing device is configured to receive the communications packet and display lux values of the first intensity of light, the second intensity of light and the third intensity of light on a map of the mapping application.

2. The light intensity monitoring system of claim 1, wherein:
   the microcontroller is configured to continue to receive the lux values of first intensity of light, the second intensity of light and the third intensity of light and the location over successive sampling times and transmit the measurements and the location of the vehicle for each successive sampling time in successive communications packets in real time; and
   the remote computing device is configured to receive the lux values and the location for each successive sampling time and display the measurements and the location for each successive sampling time on the map.

3. The light intensity monitoring system of claim 2, wherein:
   the remote computing device is a smart device which includes a light intensity monitoring computing application;
   the microcontroller is configured to transmit the successive communications packets by the dual-mode near-field communications transceiver to the smart device in real time; and
   the light intensity monitoring computing application is configured to display the map on a display screen of the smart device.

4. The light intensity monitoring system of claim 2, further comprising:
   a remote server;
   wherein the microcontroller is configured to transmit the successive communications packets by the wireless network communications unit to the remote server;
   wherein the remote server is configured to receive the successive communications packets and transmit the successive communications packets to the remote computing device;
   wherein the remote computing device is wirelessly connected to the remote server, wherein the remote computing device includes a light intensity monitoring computing program; and
   wherein the light intensity monitoring computing application is configured to display the map on a display screen of the remote computing device.

5. The light intensity monitoring system of claim 1, wherein the circuit board is connected to a battery of the vehicle to receive power to operate the microcontroller, the first light sensor, the second light sensor, the third light sensor, the wireless network communications unit and the dual-mode near-field communications unit.

6. The light intensity monitoring system of claim 1, wherein the wireless communications device is an LTE modem configured to communicate over any one of a 2G, a 3G, a 4G and a 5G wireless network.

7. The light intensity monitoring system of claim 1, further comprising:
a database of expected light intensity measurements for each location along the roadway;
wherein the light intensity measurements have units of lumens per square area (lux);
wherein the remote computing device is further configured to generate a time series compliance report which compares the lux levels at each location to expected lux levels stored in the database.

8. The light intensity monitoring system of claim 7, wherein:
the lux levels at each location record the intensity of street lighting at each location; and
the compliance report further includes a faulty street light alert for each location at which the lux level of the street lighting is not equal to or greater than the expected lux level.

9. The light intensity monitoring system of claim 7, wherein:
the database further includes environmental light level standards for each location;
the lux levels at each location record the environmental light level at each location; and
the compliance report further includes an environmental light pollution alert for each location when the lux level of the environmental light level is greater than the environmental light level standard for the location.

10. A light intensity monitor for measuring environmental light along a roadway, comprising:
a waterproof housing having a top wall, four sidewalls and a bottom wall;
a first light sensor mounted within an aperture in a first sidewall, wherein the first light sensor is configured to measure a lux value of an intensity of light impinging on an outer surface of the first sidewall;
a second light sensor mounted within an aperture in a second sidewall, wherein the second sidewall is directly opposite the first sidewall, wherein the second light sensor is configured to measure a lux value of an intensity of light impinging on an outer surface of the second sidewall;
a third light sensor mounted an aperture in the top wall, wherein the third light sensor is configured to measure a lux value of an intensity of light impinging on the first sensor from above the waterproof housing;
a pair of magnets mounted in the bottom wall, wherein the pair of magnets are configured to attach the waterproof housing to a roof of a vehicle;
a power connector mounted within a third sidewall near the bottom wall;
a circuit board mounted in the waterproof housing on the third sidewall above the power connector, wherein the circuit board includes:
a wireless network communications unit;
a dual-mode near-field communications unit;
a global positioning receiver;
an inter-integrated circuit (I2C) connected to each of the first light sensor, the second light sensor and the third light sensor;
a microcontroller operatively connected to the power connector, the wireless network communications unit, the dual-mode near-field communications unit, the global positioning receiver and the I2C circuit, wherein the microcontroller includes circuitry and a memory including programming instructions stored therein that, when executed by one or more processors, cause the one or more processors to:
receive the lux values of the first intensity of light, the second intensity of light and the third intensity of light over a first sampling time from the I2C switch;
receive the location of the vehicle during the first sampling time from the global positioning receiver;
generate a communications packet including the lux values of the first intensity of light, the second intensity of light, the third intensity of light and the location of the vehicle; and
transmit the communications packet to a remote computing device over one of the wireless network communications unit and the dual-mode near-field communications unit.

11. The light intensity monitor of claim 10, further comprising:
a first Fresnel lens located on an outer surface of the first wall, wherein the first Fresnel lens is configured to cover the first light sensor;
a second Fresnel lens located on an outer surface of the second wall, wherein the second Fresnel lens is configured to cover the second light sensor;
a third Fresnel lens located on an outer surface of the top wall, wherein the third Fresnel lens is configured to cover the third light sensor,
wherein each Fresnel lens is configured to focus light impinging on the Fresnel lens onto the respective light sensor.

12. The light intensity monitor of claim 10, wherein:
the power connector is configured to connect to a battery of the vehicle to receive power to operate the microcontroller, the first light sensor, the second light sensor, the third light sensor, the wireless network communications unit and the dual-mode near-field communications unit.

13. The light intensity monitor of claim 10, wherein the pair of magnets are neodymium magnets.

14. The light intensity monitor of claim 10, wherein the light intensity measurements have units of lumens per square area (lux).

15. The light intensity monitor of claim 10, further comprising:
a removable lid located on a fourth sidewall;
four threaded channels located in the waterproof housing, wherein the waterproof housing is configured with four corners, wherein each corner includes a threaded channel;
four screw holes located in the removable lid, wherein each screw hole is configured to align with one of the four threaded channels;
four screws, wherein each screw is configured to be inserted through a screw hole into a respective one of the four threaded channels to mate the removable lid to the waterproof housing; and
a gasket located on the waterproof housing, wherein the gasket is configured to provide a waterproof seal between the lid and a contacting surface of the waterproof housing.

16. The light intensity monitor of claim 10, further comprising:
a support board mounted with the waterproof housing perpendicular to the circuit board and beneath the top wall, wherein the support board is configured to support the global positioning receiver such that an internal antenna of the global positioning receiver is oriented to face towards the top wall.

17. The light intensity monitor of claim 10, further comprising:
a first DC/DC converter connected to the power connector, wherein the first DC/DC converter is configured to provide low power DC voltage to the microcontroller and light sensors; and
a second DC/DC converter connected to the power connector, wherein the second DC/DC converter is configured to provide high power DC voltage to the wireless network communications unit and the global positioning receiver.

18. A method for monitoring light intensity along a roadway, comprising:
measuring during successive time periods, with a light intensity monitor located on a roof of a vehicle travelling on the roadway, a lux value of an intensity of light impinging on a top wall of the light intensity monitor, a lux value of an intensity of light impinging on a first sidewall of the light intensity monitor and a lux value of an intensity of light impinging on a second sidewall opposite the first sidewall of the light intensity monitor, wherein the first sidewall and the second sidewall are oriented on the roof of the vehicle perpendicular to a direction of travel of the vehicle;
measuring, by a global positioning sensor, a location of the vehicle at each successive time period;
generating, by a microcontroller located in the light intensity monitor, a communications packet including the lux values of the intensity of light impinging on the top wall of the light intensity monitor, the lux values of the intensity of light impinging on the first sidewall of the light intensity monitor and the lux values of the intensity of light impinging on the second sidewall with the location of the vehicle for each successive time period;
transmitting the communications packet to a remote computing device over one of a wireless network communications unit and a dual-mode near-field communications unit;
receiving, by the remote computing device each successive communications packet; and
displaying, on a mapping application of the remote computing device, the lux values of the first intensity of light, the second intensity of light and the third intensity of light with the location of the vehicle for each successive time period.

19. The method of claim 18, further comprising:
generating, by the remote computing device, a time series compliance report which compares the lux levels at each location to expected lux levels stored in a database, wherein the lux levels at each location record the intensity of street lighting at each location; and
generating a faulty street light alert for each location at which the lux level of the street lighting is not equal to or greater than the expected lux level.

20. The method of claim 18, further comprising:
generating, by the remote computing device, a time series compliance report which compares the lux levels at each location to environmental light level standards for each location stored in a database; and
generating an environmental light pollution alert for each location when the lux level of the environmental light is greater than the environmental light level standard for the location.

\* \* \* \* \*